United States Patent
Van Bael et al.

(10) Patent No.: US 7,346,408 B2
(45) Date of Patent: Mar. 18, 2008

(54) TWO-DIMENSIONAL GRAPHICS FOR INCORPORATING ON THREE-DIMENSIONAL OBJECTS

(75) Inventors: Kristiaan K. A. Van Bael, Sint-Laureins (BE); Veerle M. R. M. Van Eeckhaute, Knokke-Heist (BE); Frank Adegeest, VC Hulst (NL)

(73) Assignee: Esko IP NV, Ghent (BE)

( * ) Notice: Subject to any disclaimer, the term of this patent is extended or adjusted under 35 U.S.C. 154(b) by 126 days.

(21) Appl. No.: 11/220,395

(22) Filed: Sep. 6, 2005

(65) Prior Publication Data

US 2007/0055401 A1 Mar. 8, 2007

(51) Int. Cl.
*G06F 19/00* (2006.01)
*G06F 17/50* (2006.01)
(52) U.S. Cl. ............ 700/98; 700/182; 715/964
(58) Field of Classification Search ....... 700/95–98, 700/182; 703/1, 2; 706/919–923; 715/964; 345/419–427, 619
See application file for complete search history.

(56) References Cited

U.S. PATENT DOCUMENTS

| | | | | |
|---|---|---|---|---|
| 5,852,442 A | * | 12/1998 | Morito | 345/419 |
| 6,124,858 A | * | 9/2000 | Ge et al. | 345/619 |
| 6,308,144 B1 | * | 10/2001 | Bronfeld et al. | 703/2 |
| 6,356,287 B1 | | 3/2002 | Ruberry et al. | 345/864 |
| 6,359,629 B1 | * | 3/2002 | Hopcroft et al. | 345/620 |
| 6,684,116 B1 | * | 1/2004 | Scott | 700/98 |
| 6,944,513 B1 | * | 9/2005 | Tomomitsu et al. | 700/98 |
| 6,965,846 B2 | * | 11/2005 | Krimmer | 703/2 |
| 2001/0016805 A1 | * | 8/2001 | Gupta et al. | 703/7 |
| 2003/0071810 A1 | * | 4/2003 | Shoov et al. | 345/420 |
| 2003/0098994 A1 | * | 5/2003 | Tacke | 358/1.18 |

(Continued)

FOREIGN PATENT DOCUMENTS

EP 1 074 192 A1 7/2001

(Continued)

OTHER PUBLICATIONS

"ArtiosCAD Modules". Downloaded Jul. 1, 2005 from http://www.esko-graphics.com/ , Esko-Graphics, Gent, Belgium.

(Continued)

*Primary Examiner*—M. N. Von Buhr
(74) *Attorney, Agent, or Firm*—Dov Rosenfeld; Inventek

(57) ABSTRACT

A method and a carrier medium carrying code to execute a method of designing a carton. The method includes accepting carton structural information, forming a 2D unfolded model of the substrate that when cut and folded forms the carton, and forming a 3D model of the carton. The method further includes displaying a 2D view of the unfolded carton design, and a perspective view of the 3D model. A user has the ability to manipulate the view of the 3D model, and also to select a flap of the carton on perspective view. As a result of the selecting, the method modifies the 2D unfolded view to be of the selected flap shown in an orientation suitable for designing the selected flap. The user designs the flap and the method accepts the design. The method includes modifying the perspective view of the 3D model to include any changes made in the design.

37 Claims, 25 Drawing Sheets

U.S. PATENT DOCUMENTS

| | | | |
|---|---|---|---|
| 2003/0176986 A1 | 9/2003 | Dietsch et al. | 702/150 |
| 2003/0231214 A1* | 12/2003 | Chin et al. | 345/804 |
| 2004/0019402 A1* | 1/2004 | Bourne et al. | 700/165 |
| 2005/0091626 A1* | 4/2005 | Okano et al. | 716/11 |
| 2005/0093860 A1 | 5/2005 | Yanagisawa et al. | 345/419 |

FOREIGN PATENT DOCUMENTS

| | | |
|---|---|---|
| EP | 1 162 575 A2 | 12/2001 |
| WO | WO 97/18533 | 5/1997 |

OTHER PUBLICATIONS

"FoldUP!3D for OS X". Press Release available Sep. 30, 2003. Downloaded Jul. 1, 2005 from http://www.comnet-network.co.jp/eng/news.html?ct=h1. Comnet Co., Ltd., Chuo-ku, Kobe, Japan.

"FoldUP!3D Design Workflow". Downloaded Jul. 1, 2005 from http://www.comnet-network.co.jp/eng/product/f3d/F3Dworkflow.html, Comnet Co., Ltd., Chuo-ku, Kobe, Japan.

"FoldUP!3D". Downloaded Jul. 1, 2005 from http://www.comnet-network.co.jp/eng/product/FoldUP3D.html, Comnet Co., Ltd., Chuo-ku, Kobe, Japan.

John E. Parsons. "A First Look at Quark Wrapture 1.0". *The Sebold Report on Publishing Systems*, vol. 30, No. 7, Dec. 29, 2000.

"Quark Announces New, Enhanced Features in QuarkWrapture 1.5: Next Version of Quark Packaging Software Begins Public Testing". Press Release Apr. 25, 2001. Downloaded Jul. 1, 2005. Quark, Inc., Denver, CO. Available online at http://www.quark.com/about/presscenter/prview.jsp?idx=127.

Rob McAllister. "Unwrapping QuarkWrapture: QuarkWrapture takes the guesswork out of package design". *Electronic Publishing*, May 2001. Downloaded on Jul. 1, 2005 from http://ep.pennnet.com/home.cfm.

"Score!X Workflow". Downloaded Jul. 1, 2005. Score!X, an Artwork Systems Inc. company, Bristol, PA. Available online at http://www.score-x.com/flow.htm.

Anonymous: "SurfMaster Unfolding Software Pack" Internet Article, [Online] Jul. 15, 2004. Retrieved from <http://www.card-models.com/surfmaster.pdf>. [retrieved on May 7, 2007].

Eisenberg M et al: "Creating polyhedra models by computer", Journal of Computers in Mathematics and Science Teaching, Assoc. for the Advancement of Computing IN, US, 1997, pp. 1-33. ISSN: 0731-9258.

* cited by examiner

TWO-DIMENSIONAL GRAPHICS FOR INCORPORATING ON THREE-DIMENSIONAL OBJECTS

BACKGROUND

The present invention relates generally to computerized design of two-dimensional graphics for use on three-dimensional objects such as containers, cartons, boxes, and the like, and more specifically to a computerized graphic design method to facilitate proper alignment and sizing of graphics printed on a substrate from which two-dimensional flaps and panels are cut and folded to form a three-dimensional container bearing the graphics.

Containers, cartons, boxes, and the like (collectively referred to herein as cartons) are commonly formed into 3D-shapes from a planar substrate such as corrugated cardboard, although other material may be used. The substrate is often printed with graphics, scored, and then folded at scored edges through a typically 90° fold angle to form the three-dimensional shape of the carton. The various planes of the carton, e.g., top, bottom, sides in the case of a rectangular box, are often referred to as panels, and a panel may be formed from, or include, several flaps. A side of a carton that is made up of a single panel without flaps is often termed a carton surface.

Thus, in this description, a panel is a flat part of the final 3D-shape of the carton, and a flap is a part of the unfolded design. Each panel has one flap, and some may have more. FIG. 1A shows a box 100 whose bottom panel 102 has four flaps 103, 104, 105, and 106.

FIG. 1B depicts the nomenclature used in the present description in more detail with reference to an exemplary carton 110. Carton 110 is formed from a sheet or roll of substrate material 120 that is scored, cut, (or cut and then scored), and folded generally at scored fold edges 130 through a fold angle θ to define various carton panels. Fold angle θ is typically 90°, where 0° is defined as being in the plane of the unfolded material. Carton 110 is shown with upper and lower panels 140, 150, front and rear panels 160, 170, and left and right panels 180 and 190. Front panel 160 is shown as comprising a single panel and thus may also be referred to as carton surface 160. In the example shown in FIG. 1B, upper panel 140 is formed from two half-flaps 140A and 140B, and right panel 190 is formed from no less than five flaps 190A, 190B, 190C, 190D, and 190E. It is understood that panels may, but need not be, formed from flaps.

The outer panel surfaces of cartons frequently will have been printed with graphic designs that can advertise the product within and convey other useful information. The printed design may be graphics per se, text, or other indicia (collectively referred to herein as graphics). In the prior art, a graphics artist typically will design the graphics for container 110 on a panel-by-panel basis. Such design is undertaken without the graphics artist having knowledge of how the carton is folded, or even how some of the panels may be formed from individual flaps, or portions of flaps. Thus the graphics for upper panel 140 may be rendered as a first electronic file, created on a computer using a software drawing program, the graphics for front and rear panels 160 and 170 may be rendered as second and third electronic files. The right panel 190 may be rendered as yet another electronic file. In some instances the flaps that comprise a panel may themselves be created as separate electronic files. The graphics depicted on right panel 190 may be generated from as many as five separate electronic files, one file for each flap 190A, . . . , 190E. While the various panel files may be combined into a single file, the point to be made is that the graphics are generally created on a per-panel or per-flap basis, almost as though separate graphic design projects were being undertaken.

In creating the various electronic files, the graphics artist generally is concerned only with the dimensions of the various substrate areas of interest, e.g., the overall size of the individual panels and flaps to be printed. How the substrate will be folded to form a carton is generally the responsibility of a structural designer and too often may be of little concern to the graphics artist. Indeed, the graphics artist typically is more concerned with how the printed graphics will look on individual panels or on the finished product—a three-dimensional carton, than how the graphics need to be laid out on the different flaps.

Computerized tools are known in the art to aid in the structural design of the carton by embedding folding information in the structural design, and to allow the graphical designer to take a flat or planar layout and, using folding information, view the design on a computer monitor in a rendered three-dimensional form.

But it can be very challenging to design and print graphics on a substrate to ensure that after the carton is cut from the substrate and folded, the various graphic images will have been printed with proper orientation, sizing, and good registration, e.g., such that there is image continuity for an image that may extend over more than one flap or panel. Understandably proper orientation, sizing, and registration can be problematic where images on several folded flaps combine to create a larger panel image, e.g., in right panel 190 in FIG. 1B. Designing and creating such graphics is both labor intensive and very prone to error, including error from print bleeding.

Commonly-assigned U.S. patent application Ser. No. 10/762,217 to inventor Bru, published Jul. 21, 2005 as US 20050157342, and titled METHOD FOR DESIGNING TWO-DIMENSIONAL GRAPHICS FOR USE ON THREE-DIMENSIONAL CARTONS BEARING SUCH GRAPHICS, describes a method to aid in the design of a carton. The contents of US 20050157342 are incorporated herein by reference. The method of US 20050157342, e.g., in the form of a program, provides for construction of a three-dimensional model of the carton showing the graphics to be printed. The graphics program is provided with carton structural input information including dimensions of the various panels and flaps, fold or score lines, and fold angles; this information is available from the carton structural designer. The method includes accepting graphics to be printed on a panel of a finished carton, e.g., a panel that has several flaps, and provides for automatically positioning and manipulating the graphics using available carton structural information. A graphics program implementing the method generates a single computer file containing graphics for each panel and flap of the carton to be created from the substrate material. The graphics program creates both planar and three-dimensional images of the carton for display and manipulation on a computer monitor. The displayed images can be of the carton with graphics. While viewing such a display, a graphics designer can rotate, scale, and otherwise manipulate the displayed graphics, as needed, to accommodate each panel and flap, and can define clipping masks as needed. This ability to view and manipulate a three-dimensional computer-generated image of a virtual carton whose panels and flaps contain the graphics allows the graphics artist to confirm proper alignment, orientation, and scaling of graphics on the finished carton. The computer-generated file is output and made available as input to a carton production system to control printing of graphics on the flat substrate before the substrate is cut and folded to yield the three-dimensional carton bearing the printed graphics.

While the method of US 20050157342 provides some improvement over the prior art, there still is room for improvement. For example, the inventors have found that it is sometimes difficult to design graphics into the 2D unfolded view of a carton because, for example, the graphics appear upside down or otherwise rotated in the unfolded view.

Furthermore, it is sometimes difficult to visualize which panel becomes which position in the 3D carton. It would be advantageous to be able to use the 3D model to interactively navigate in the 2D unfolded view of the carton. It further would be advantageous to be able to place alignment guides into the 3D model and see the results as guides in the 2D unfolded view of the carton.

SUMMARY

Presented herein are a method and a software product implementing the method, to aid a user, e.g., a graphic designer, to design two-dimensional graphics for use on three-dimensional cartons bearing such graphics. The method includes generating, displaying and manipulating a three-dimensional model of the folded carton showing the graphics to be printed. Such a display provides the user with immediate feedback of the graphics on the folded carton. Changes to the graphics in the two-dimensional unfolded version of the carton are immediately reflected in the three-dimensional model of the carton. This helps the user to see whether the graphics are properly aligned and sized. An aspect of the present invention provides for the designer the ability to select flaps in the three-dimensional model. The user then can zoom in on the selected flap in the two-dimensional unfolded view of the carton. If desired, the two-dimensional unfolded view of the carton can be rotated, such that, for example, the user will never have to design part of the graphics upside down. In addition, another aspect of the invention provides for the user the ability to define three-dimensional guides. In one implementation, the user "draws" a guide on the display in the form of a line in one of the flaps of the 2D unfolded design. This guide is translated to a 3D guide surface. Where this surface intersects with the panels of the 3D model, a guide is displayed, such that, for example, the one guide that the user has drawn in one of the flaps may result in several guides in several flaps. The user can use these guides when aligning objects in the different panels. This may help the user to ensure continuity of the graphics over different panels.

One aspect of the invention is a computer-implemented method of designing a carton having a plurality of panels. Each panel is made up of one or more flaps. Another aspect is a carrier medium carrying computer readable code to execute a method of designing a carton having a plurality of panels. Each panel is made up of one or more flaps. One embodiment of the method includes accepting carton structural information corresponding to a carton, forming a 2D unfolded model of the substrate that when cut and folded according to the carton structural information forms the carton, and forming a 3D model of the carton corresponding to the carton structural information. The method further includes displaying a 2D view of the unfolded carton design on a first display, and a perspective view of a 3D model of the carton on a second display. Such a perspective view is also called a 3D view herein and a perspective 3D view herein. A user has the ability to manipulate the 3D view on the second display, and also to select a flap of the carton on the view of the 3D model on the second display. As a result of the selecting of a flap, the method automatically modifies the 2D unfolded view in the first display to be of the selected flap shown in an orientation suitable for the user to design the selected flap. The user designs the flap and the method accepts the design. The method includes modifying the 3D view to include any changes made in the design. The method is arranged such that the user has the ability to indicate on the 3D view, an action to be performed on the 2D unfolded view. One version of the method is arranged such that the 3D view provides for the user to select a flap for design, such that the 2D unfolded view provides for the user the ability to design the selected flap, such that the perspective 3D view of the 3D model is updated to reflect a change made in the 2D unfolded view.

In one embodiment of the method, the automatically modifying the view in the first display is arranged so that display shows the selected flap right side up, including temporarily rotating the 2D unfolded design as required to produce the right side up view.

DETAILED DESCRIPTION

Presented herein is a method, apparatus, and carrier medium carrying code to instruct a processor to execute a method. The method helps facilitate for a designer the proper alignment and sizing of graphics printed on a substrate from which two-dimensional flaps and panels are cut and folded to form a three-dimensional container bearing the graphics.

Figure 1A:
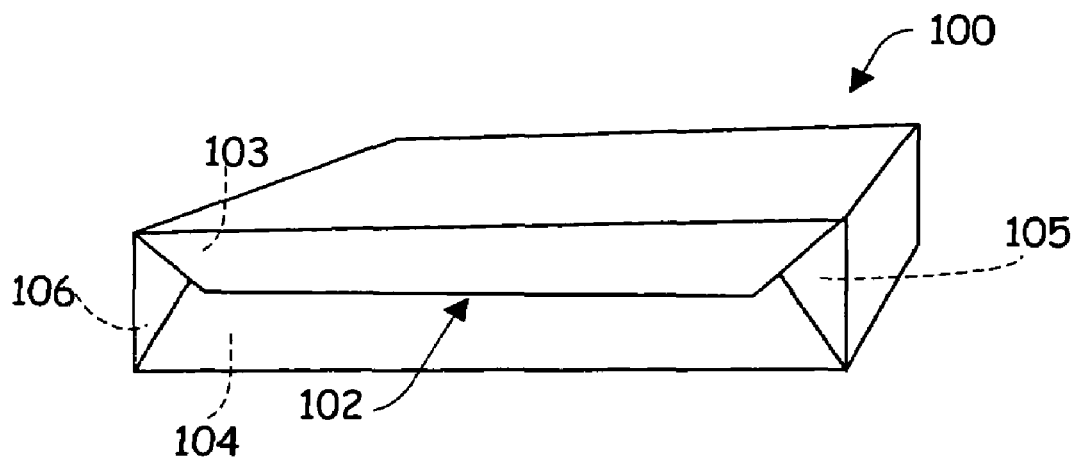
FIGS. 1A and 1B show a carton and various faces and flaps, and is used to define terminology.
Figure 1B:
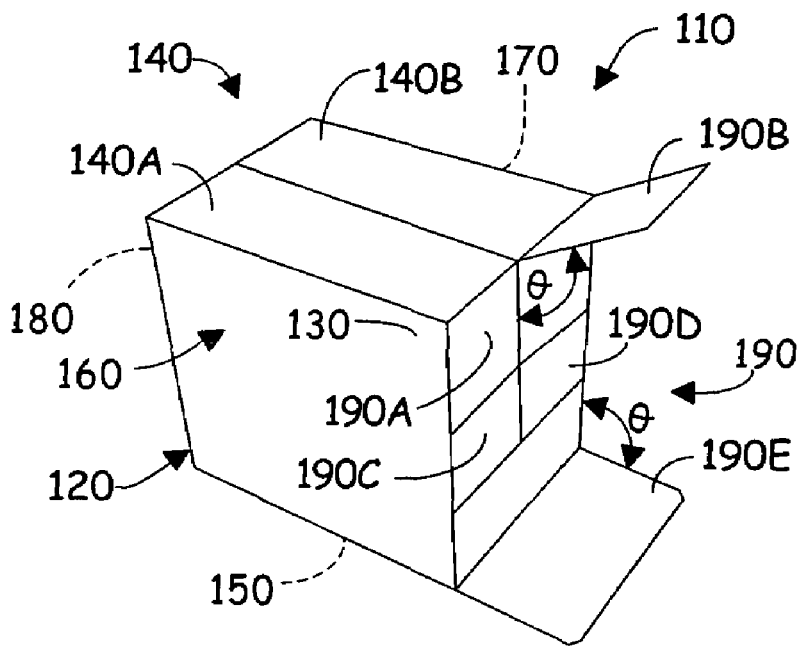
Figure 2:
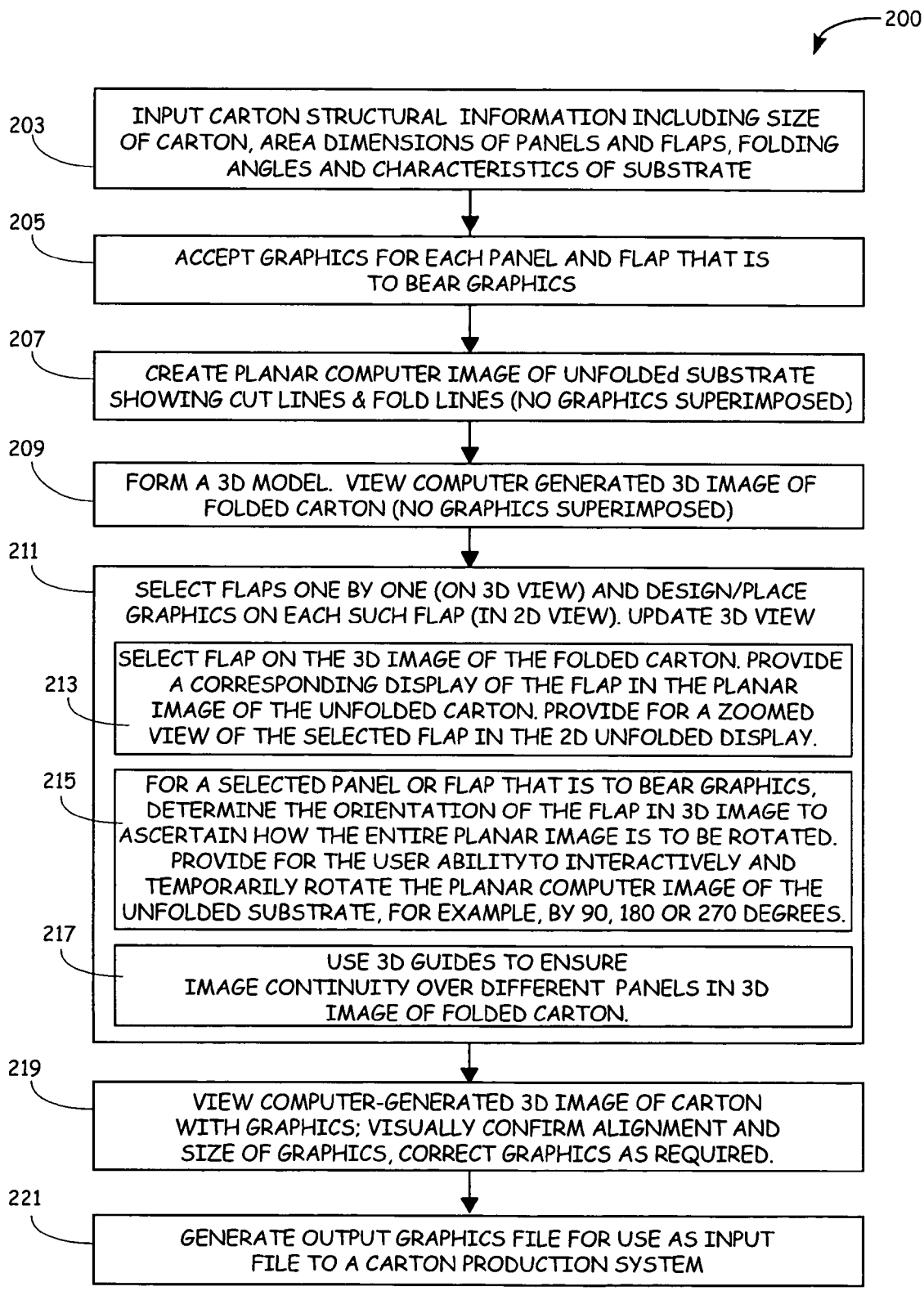
FIG. 2 shows a flowchart of one method embodiment of the invention.

FIG. 2 shows a flowchart of a method embodiment 200 of the invention. Using the method 200, two-dimensional graphics can be accurately created for printing on a substrate from which panels and flaps can be cut and folded to form a three dimensional carton with graphics printed thereon. The method provides for a user the ability to achieve good alignment and registration of the overall graphics on the completed three-dimensional carton, with reduced labor and reduced likelihood of human error compared to prior art methods.

Figure 3:
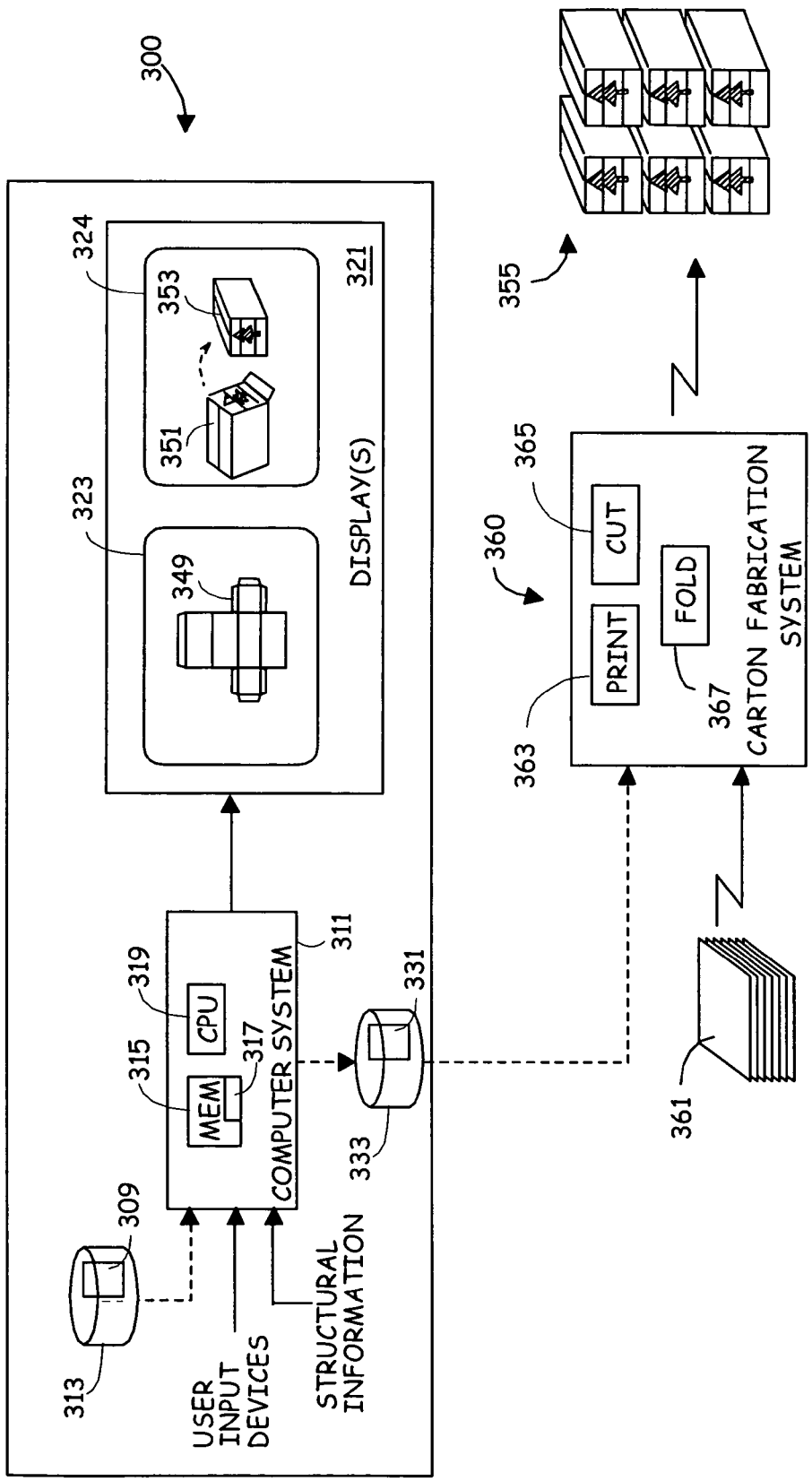
FIG. 3 shows, as an example, a simplified block diagram of system components of a design system that may be used to operate a method embodiment of the invention.

The method of FIG. 2 is implemented on a processing system, e.g., a computer system. FIG. 3 depicts system components, including a computer system, that can be used to carry out one or more method embodiments of the present invention, e.g., the method 200 of the flow chart of FIG. 2. FIG. 3 shows a graphics creation system 300 that includes a computer system 311 that has a CPU 319 and a memory 315 that typically includes persistent and non-persistent memory. Stored or loadable into memory 315 are software instructions 317 of a software program 309 that when executed by CPU 319 will cause a method embodiment of the present invention to be carried out. As indicated in FIG. 3, in some systems, the complete set of programming instructions of the program 309 that when executed implements the method may be stored on a storage medium 313, such as optical or magnetic storage, to be read into computer system 311. Those skilled in the art will recognize the storage media 313 may in fact be part of the computer system, or may be physically remote from computer system 311, and may, if desired, be accessed over a communications link such as the Internet, a network, etc.

Computer system 311 also receives as input carton structural information pertaining to the carton to be generated. This information may be in a file on storage 313, or may be manually input by the user, or may be provided to the computer system in some other way.

As CPU 319 executes instructions of the program 309, the graphics artist can create and then lay out the various graphic elements, e.g., images and/or text for the panel and flap areas of a carton. Commercially available graphic design software is known in the art, and may be used as part of program 309 at this juncture. Alternatively, dedicated code may be included in software 309 for this task. Exemplary commercially available software includes PackEdge, manufactured by Esko-Graphics located in Gent/Belgium Typically the graphics artist will use one or more input devices such as a mouse, a trackball, a joystick, a digitizer tablet, and even a computer keyboard to create such images, and/or to load images from memory 315. Alternatively, the images may already be available as files in storage 313, or otherwise be available. A vast quantity of images is available, for example, from commercial vendors, and can be downloaded from numerous websites via the Internet.

The computer system includes a display subsystem 321 that includes one or more display screens. Two screens are shown in FIG. 3, and those in the art will understand that in alternate versions, the contents of the two screens 323, 324 may be shown as two windows in a single screen. The graphics artist can view on display screens 323, 324 views of the carton being designed. Shown in screen 323 is a 2D unfolded view 349 of the carton showing cuts and folds, while shown in screen 324 are 3D shaded views 351, 353 of the complete carton corresponding to the unfolded view 349. The displayed images may manipulated and new images viewed. For example, as described in more detail below, the graphics artist can superimpose on a screen, e.g., display 323, the created (and/or downloaded) graphics upon a planar outline of the carton 349. Program 317 uses the structural information to copy and position the images on the various flaps that contribute to the panel being worked on.

Since the structural information available to program 317 includes folding details and characteristics of the substrate, the artist can readily determine areas of panels and flaps that need not be printed at all because they are covered by portions of other panels or flaps. At this juncture, appropriate clipping masks can be generated by program 317 such that covered-over substrate portions are not needlessly printed with graphics. Further, appropriate clipping masks can reduce degradation of the printed imagery. In addition, the effects of ink bleeding into the substrate and into adjacent regions of the graphics are also reduced.

As described in more detail below, the graphics artist can also cause program 317 to create a three-dimensional image of the carton replete with printed graphics. Two such images 351, 353 are shown as being displayed on screen 324. In the left-hand image 351, one of the side flaps is not yet folded, whereas in the right-hand portion of the display, the side flap has been folded through a 90° fold angle, and image 351 has been rotated to permit in view 353 an end-on view of the side flap and the composite image printed on the side panel.

Once the graphics artist is satisfied that the images to be printed on the various panels and flaps have been properly created, program 317 can generate an output graphics file 331, shown here as being stored in a storage subsystem 333 which may, in some embodiments, be the same as storage subsystem 313.

The remaining portion of FIG. 3 will now be described to illustrate the practical use of output graphics file 331. A carton fabrication system 360 is depicted in FIG. 3 as receiving data and information (collectively data) that is input from graphics file 331, and also receiving as input raw planar substrate material 361 that is to be printed with graphics, according to aspects of the present invention, and formed into cartons 355. Carton fabrication system 360 benefits from aspects of the present invention, but need not be considered part of aspects of the present invention.

In the broadest sense, system 360 may be said to include a printing sub-system 363 that is responsive to data on graphics file 331, a cutting sub-system 365 that is responsive to cutting data also present on graphics file 331, and a folding sub-system 367 that will fold already-printed, already cut and scored substrate along fold-lines, defined by data on graphics file 331. In practice carton fabrication system 360 may include other sub-systems and the various sub-systems may be located remotely from each other. For example in some applications it may be advantageous to print planar substrate material 361 at one facility, and to then ship the printed planar substrates to another facility, perhaps a great distance away, for cutting and folding. Economics and equipment available at a given fabrication site may govern the choice of various possible implementations of carton fabrication system 360.

In one embodiment, the output of system 360 is in the form of completed cartons 355, each of which has printed on relevant panels and flaps properly sized and oriented graphics, according to aspects of the present invention. For ease of illustration completed cartons 355 are depicted in FIG. 3 in a closed configuration, e.g., as if merchandise to be shipped is already packed within the cartons.

Returning again to the flow chart of FIG. 2, in 203, carton structural information relating to the physical characteristics of the carton to be fabricated are input. Such information is typically already available to the structural designer of the carton. In one embodiment, this information includes parameters such as the overall length, width, and depth dimensions of the carton, the area and orientation of each surface, panel, and flap, the folding or score lines and fold angles associated the panels and flaps, and the fold order. Other structural information can include thickness and composition of the substrate, including ease of folding information.

In 205, the method accepts graphics for each surface or overall panel of the completed carton that is to bear graphics. The graphics may already exist, e.g., in the form of graphic files, or a graphics artist may create the graphics, e.g., on the system 300. Even if the graphics are from an existing file, the graphics may still need to be manipulated so as to be suitable for printing on the final carton.

Figure 4:
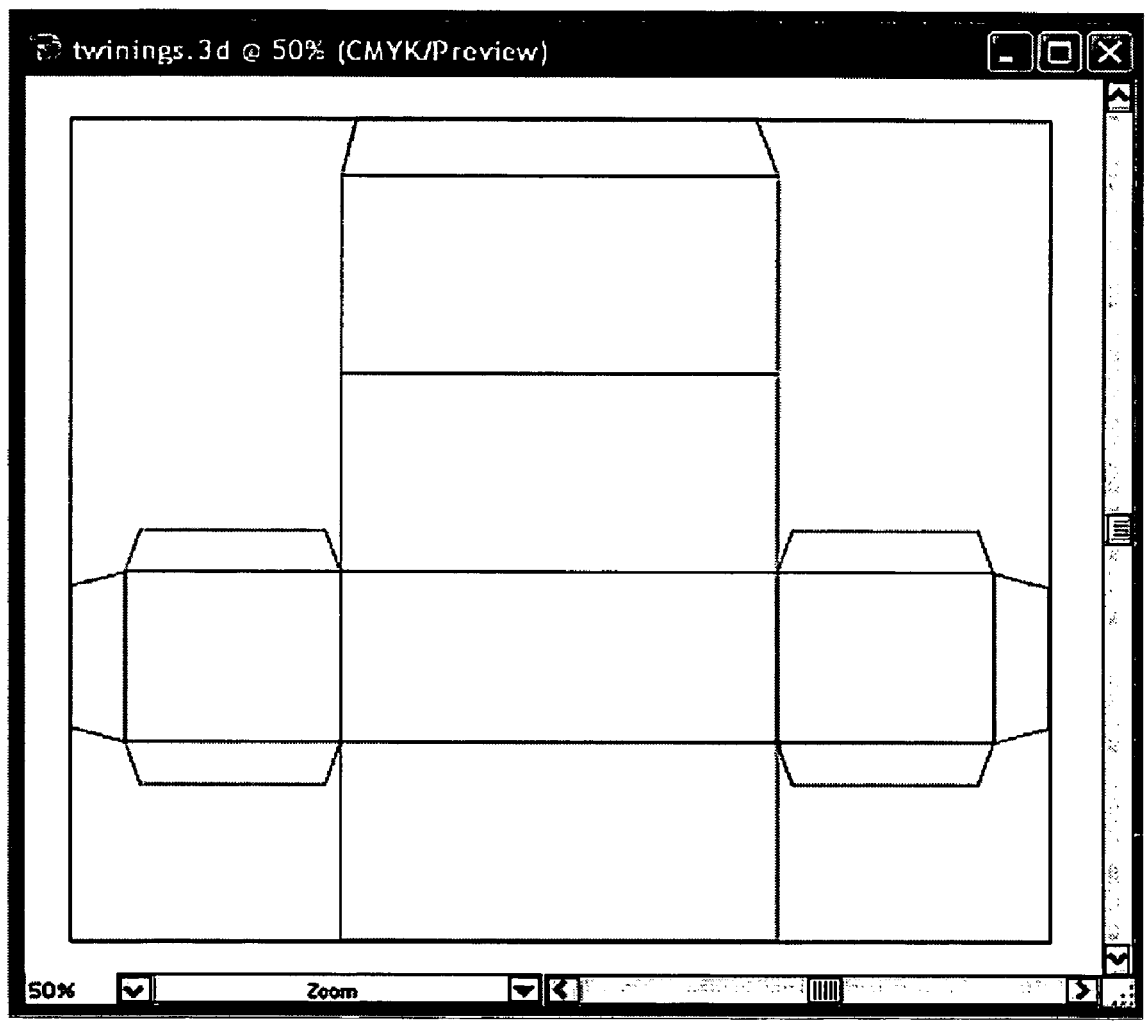
FIG. 4 shows, as an example, a display window or screen showing a two-dimensional image of the unfolded substrate according to one embodiment of the invention.

In 207 the method uses the carton structural information to create a 2D structural model of the substrate, and to display, e.g., on display system 321 a two-dimensional image of the unfolded substrate, indicating where the cut lines and scoring or fold lines are located. The folds, cuts, and scores may, for example be displayed in different colors. FIG. 4 shows a black and white version of such a display 400.

Figure 5:
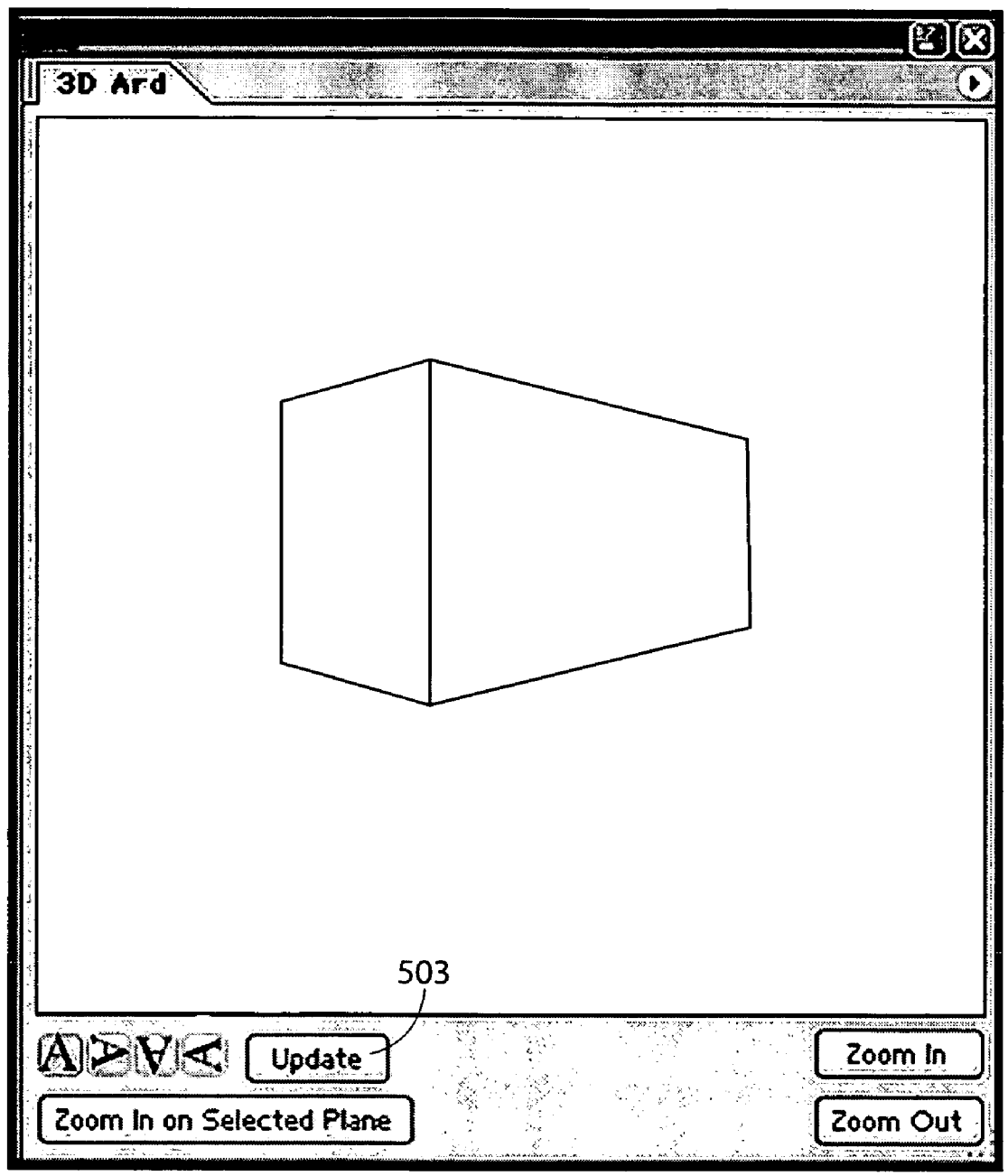
FIG. 5 shows, as an example, a perspective 3D view of the carton whose 2D unfolded view is shown in FIG. 4 according to one aspect of the invention.

In 209, the method uses the carton structural information to form a 3D model of the carton, and displays a perspective 3D view, e.g., a shaded surface view of the 3D carton. FIG. 5 shows such a view 500 of the carton whose 2D unfolded view 400 is shown in FIG. 4. Note that in one embodiment operating on a system that includes a display subsystem 321 with at least two screens, e.g., 323 and 234, the displays of FIGS. 4 and 5 are shown simultaneously on two display screens of the display system 321, as shown in FIG. 3, while in another embodiment, the two views 400 and 500 are shown as different windows of the same screen. In yet another embodiment operating on a system that includes a display subsystem 321 with at least two screens, e.g., 323 and 234, initially the two views 400 and 500 are shown as different windows of the same screen, on which the user can indicate which display is to appear on a separate window.

Using one or more of various computer input devices such as a mouse, a trackball, a digitizer tablet, a keyboard, etc., the user, e.g., a graphics artist can view the 2D unfolded display on the computer monitor and superimpose computer-generated graphics over monitor-displayed various panels of the carton in the 2D unfolded view 400. The user further can manipulate the carton, e.g., zoom in and out on the 3D view, rotate and tumble the 3D viewed model.

By simultaneously providing a 2D unfolded view and a perspective 3D view of the carton, one aspect of the invention facilitates the design task by providing for the user the ability to indicate, e.g., select on the 3D view, an action to be performed on the 2D unfolded view. Furthermore, actions performed on the 2D unfolded view may be viewed on the 3D view by the user. In the 2D unfolded view, the user, e.g., the graphic artist carries out the design task of superimposing graphics on the panels by positioning the graphics on all the flaps that contribute to this panel using information provided at step 203. The graphics artist can manipulate, e.g., stretch, shrink, rotate, invert, copy, cut, and paste portions of the graphics over the 2D outline of the substrate until satisfied that properly proportioned graphics cover the panel and flap regions intended to bear printed graphics. The results are viewable on the 3D view.

In block 211, the user selects flaps which are to bear graphics and designs/places the graphics on each such flap. This is typically carried out flap-by-flap.

One aspect of the invention is that the selecting of the flap is done in the 3D view, while the design is done on the 2D unfolded view. The result of the design updates the 3D view.

Referring first to 213, a common task is selecting a flap on which to design. Recall that a flap may be a component of a panel. One aspect of the invention is providing for the user to select a flap in the 3D view. One aspect of the invention is that when a user selects a flap in the 3D view, the 2D display is updated to show the selected flap. Another aspect of the invention is zooming the 2D unfolded view of the flap to facilitate adding graphics to the flap.

Another aspect of the invention, shown as 215 in FIG. 2, is the providing for the user by the method the ability to interactively and temporarily rotate the planar 2D image of the unfolded carton such that the selected flap's image is shown in the 2D display rotated to be the right way up to facilitate design. Thus, the method includes determining how the planar image of the unfolded substrate needs to be rotated so that the image of the selected flap is shown in the 2D display the right way up in an orientation to facilitate designing the flap. The method further includes rotating the image shown in the 2D display by the determined rotation amount. The rotation is, e.g., by 90, 180, 270 degrees, or by any angle that provides for a desired orientation.

Another aspect of the invention, shown as 217 in FIG. 2, includes using 3D guides to ensure image continuity over different panels in the 3D image of folded carton. This is explained further below when discussing the following detailed example.

Workflow

Figure 6:
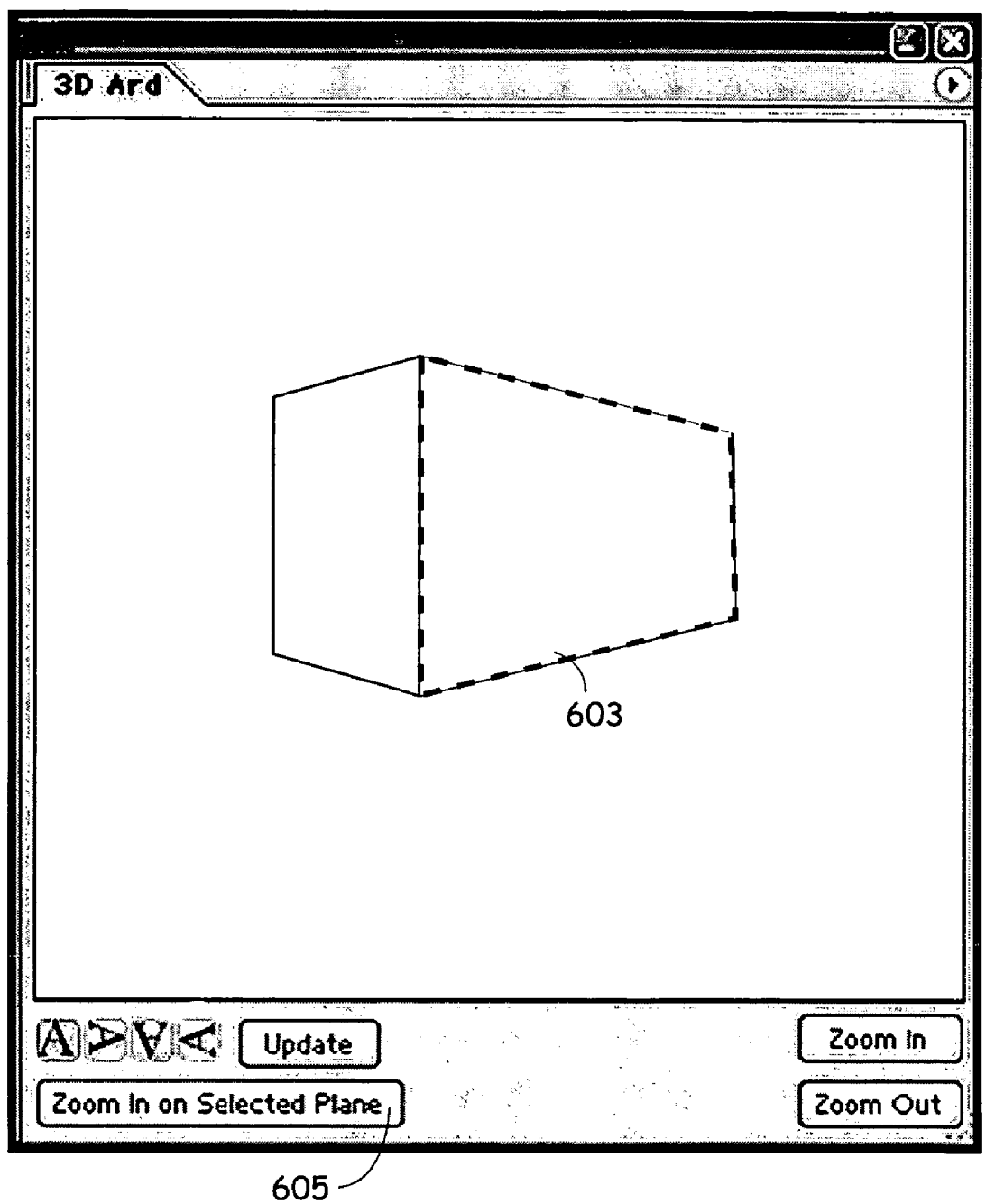
FIG. 6 shows, as an example, a perspective 3D view after a user has selected a panel having only one flap, according to an embodiment of the invention.

Consider a simple exemplary carton to be designed, e.g., the carton shown with no graphics in the 2D and 3D views of FIG. 4 and FIG. 5, respectively. In the 3D view (FIG. 5), the user may rotate the display as needed to show one or another flap of interest. For example, the user can select a flap in the 3D view, as shown in FIG. 6 for the simple case of the panel having only one flap. Selecting the flap, e.g., by clicking with a pointing device, causes the flap to be highlighted in the 3D display to provide feedback to the user. For example, the outline of the flap can be shown in one or another color, or the flap surface can change color, and so forth. FIG. 6, being a monochrome representation, shows the selected flap 603 having a broken-line outline.

The selection can be displayed in a format that is automatically zoomed and automatically rotated. By automatically is included the case of the user clicking on a button that causes an update of one or another of the displays, or both displays, the case of the user indicating to the method that the previous task is complete, and the case of the zooming occurring without any indication by the user other than the selecting. Different embodiments thus may cause the automatic zooming and rotation with or without user instruction.

Figure 7:
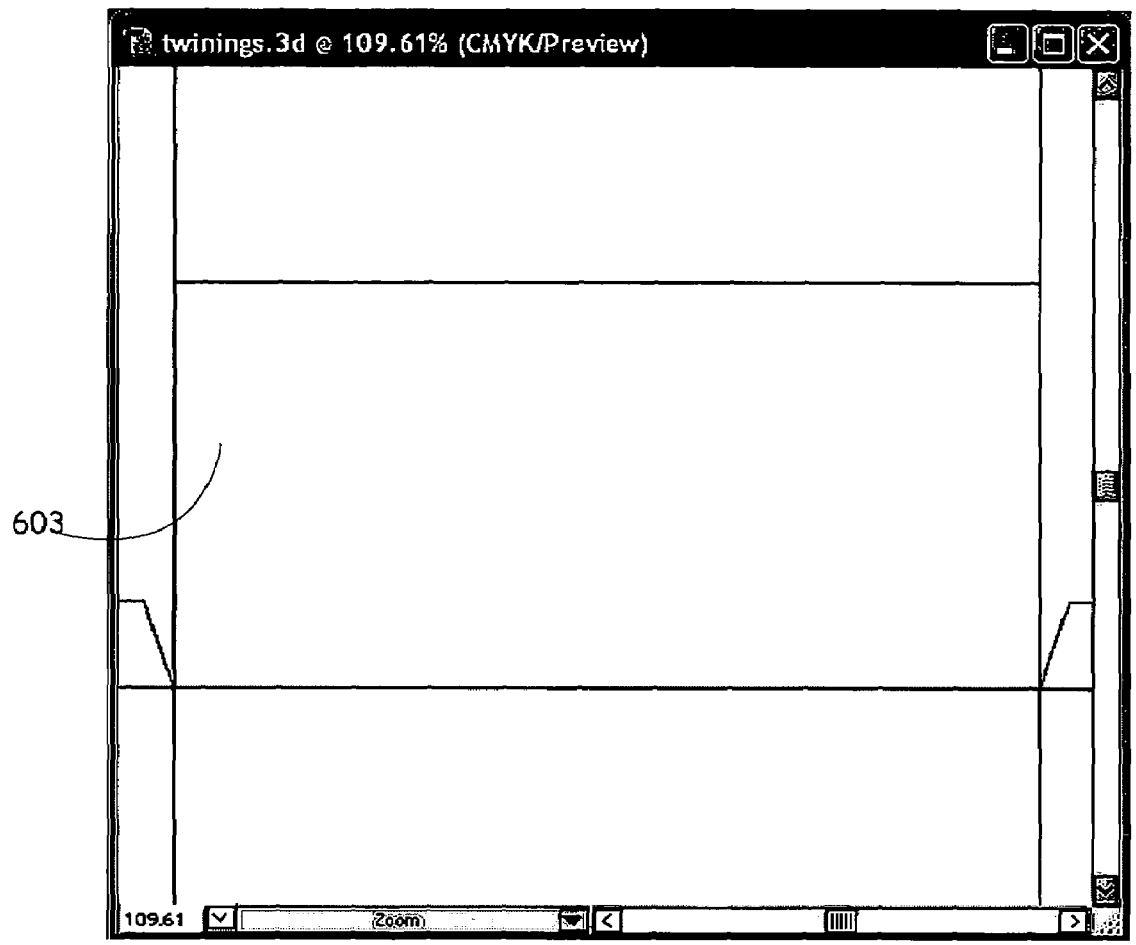
FIG. 7 shows, as an example, a zoomed 2D display of the flap selected in FIG. 6, according to an embodiment of the invention.

In this example, by pressing the button 605 indicated with "Zoom In on Selected Plane," the 2-D unfolded version of the carton is automatically zoomed in on the selected flap 603. The 2-D unfolded view will also be temporarily rotated so that what is the top line of the flap in the 3-D view is also the top line of the flap in the 2-D display. The zoomed 2D display of the selected flap 603 is shown in FIG. 7.

How to calculate the required rotation is described in more detail below.

Figure 8:
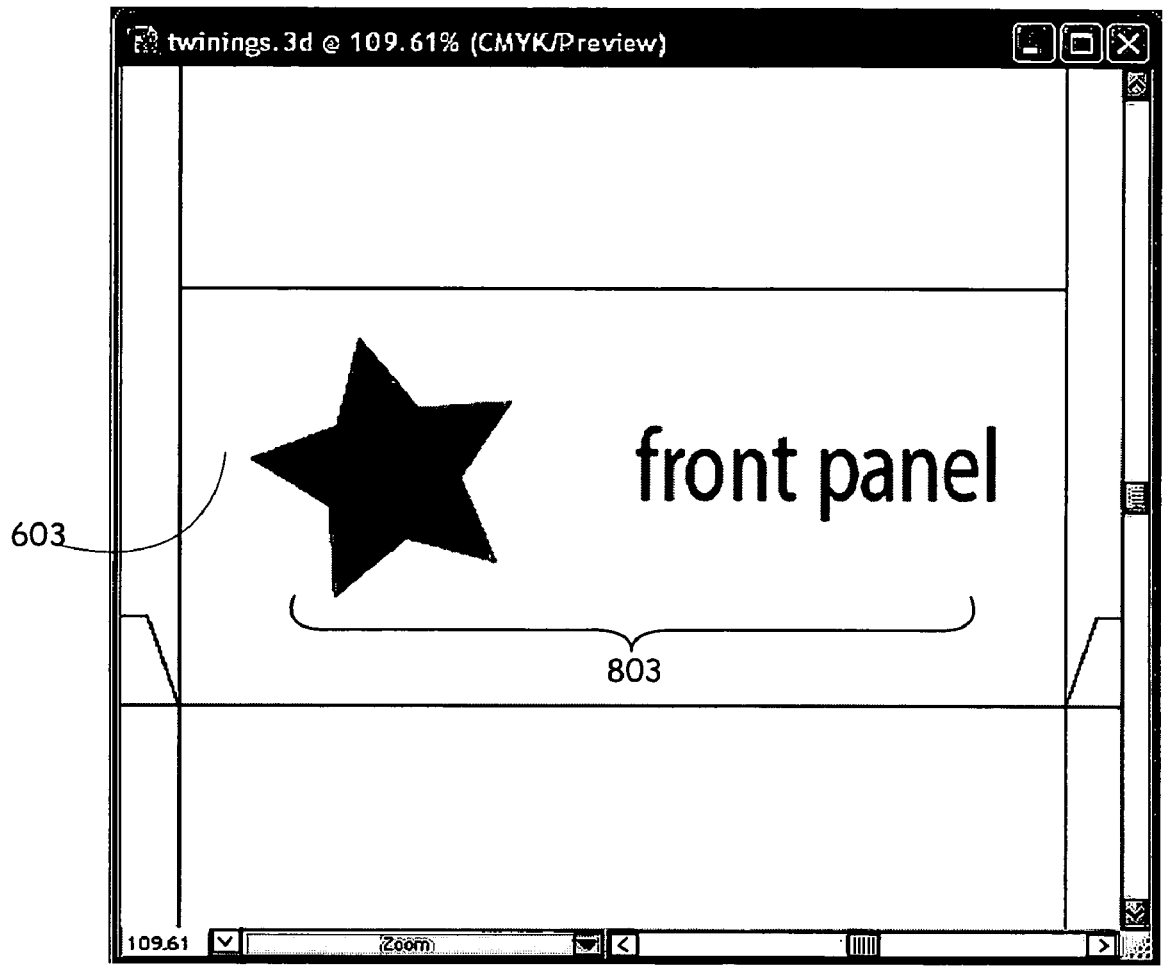
FIG. 8 shows, as an example, a graphic added onto the flap shown in the 2D display of FIG. 7, according to an embodiment of the invention.

The user is now in a position to add any graphical elements to the flap 603, as required. FIG. 8 shows graphics 803 added onto flap 603. Note that the writing is the right side up on this flap. This is because of the rotation, if necessary, when the selected flap is displayed in zoom manner in the 2D unfolded design display.

More details on designing the individual graphic elements to the flap is as described, for example, in above-mentioned US Patent publication US 20050157342, except as further elaborated below.

Figure 9:
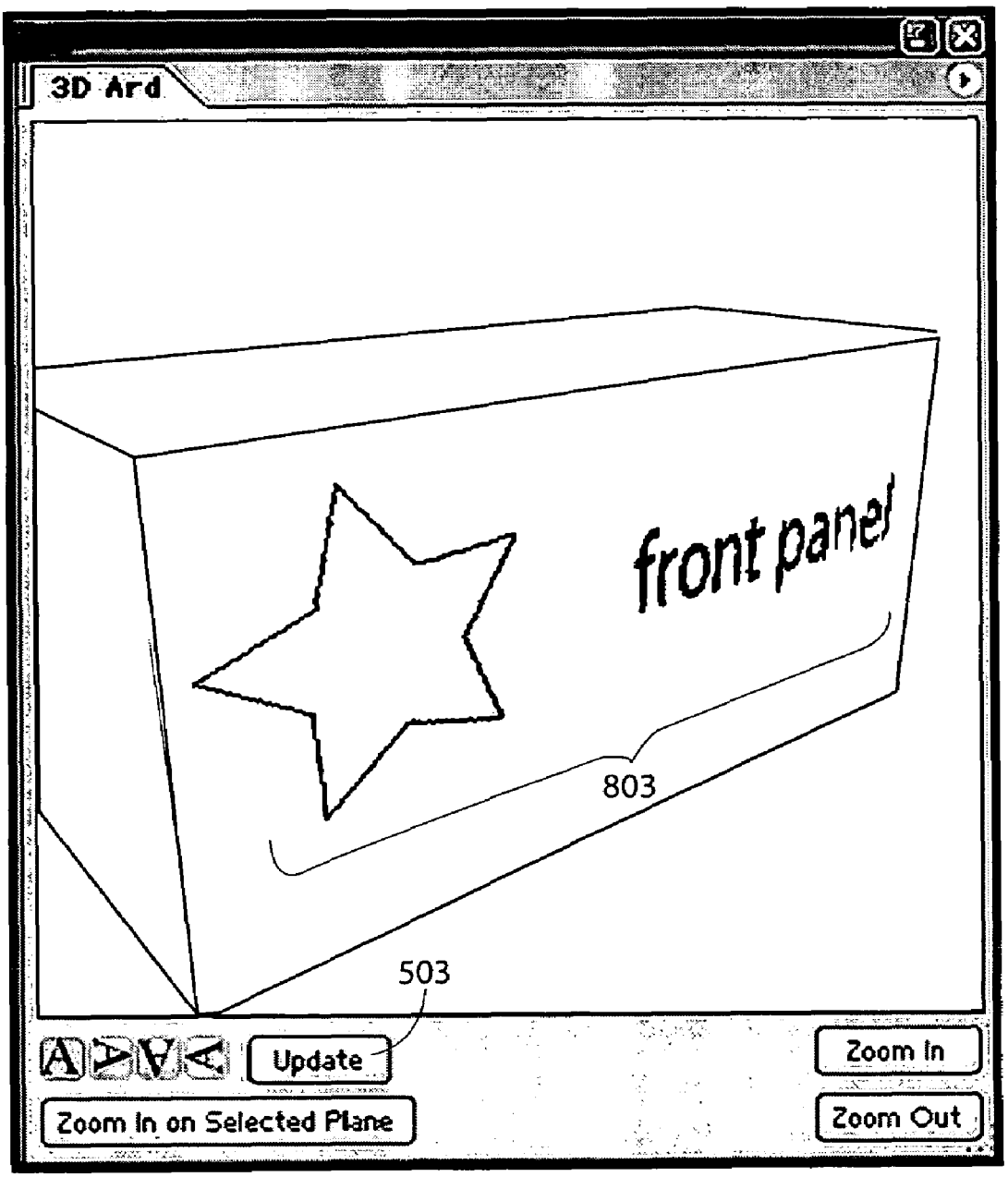
FIG. 9 shows, as an example, a slightly different zoomed and rotated view of the carton than that shown in FIG. 5, with the graphic added, according to one aspect of the invention.

Another aspect of the invention is the updating of the 3D view as the design proceeds in the 2D unfolded view. Thus, the 3D view 500 is provided with an "update" button 503 (see FIG. 5). When the user presses on the 'update' button 503 in the 3D view window 500, the 3D view immediately shows the 3D model of the carton with the graphics superimposed. FIG. 9 shows a slightly differently zoomed and rotated view of the box than shown in FIG. 5, but with the graphics 803 placed on flap 603 after the update button is pressed.

The viewer continues placing graphics on each of the flaps by, for example, rotating the 3D view, selecting the flap in the 3D view, then adding the graphics on the 2D unfolded view of the flap selected in the 3D view.

Figure 10:
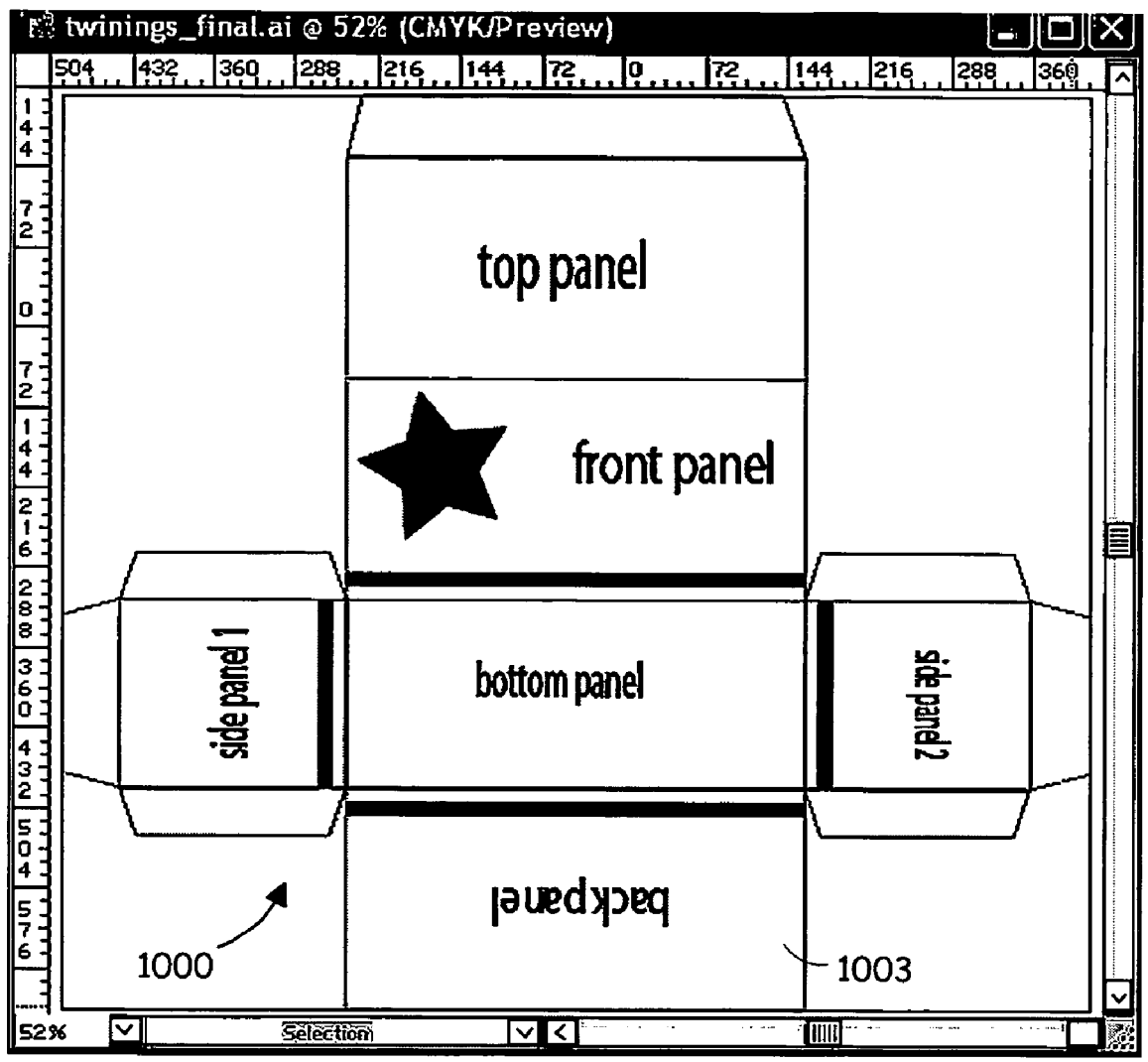
FIG. 10 shows, as an example, the 2D view of an unfolded carton.
Figure 11:
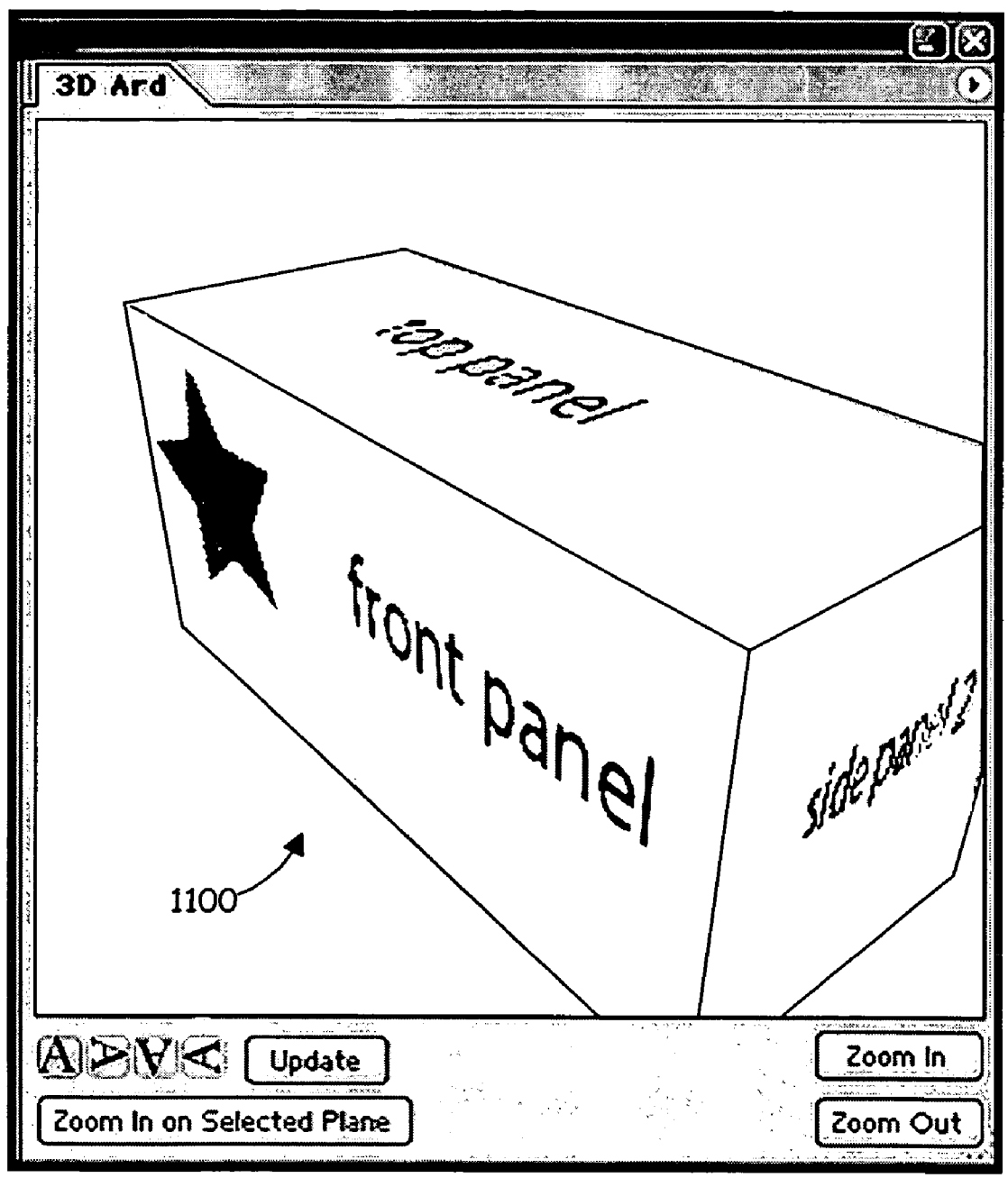
FIG. 11 shows, as an example, the corresponding perspective view of the 3D carton, according to an aspect of the invention.
Figure 12:
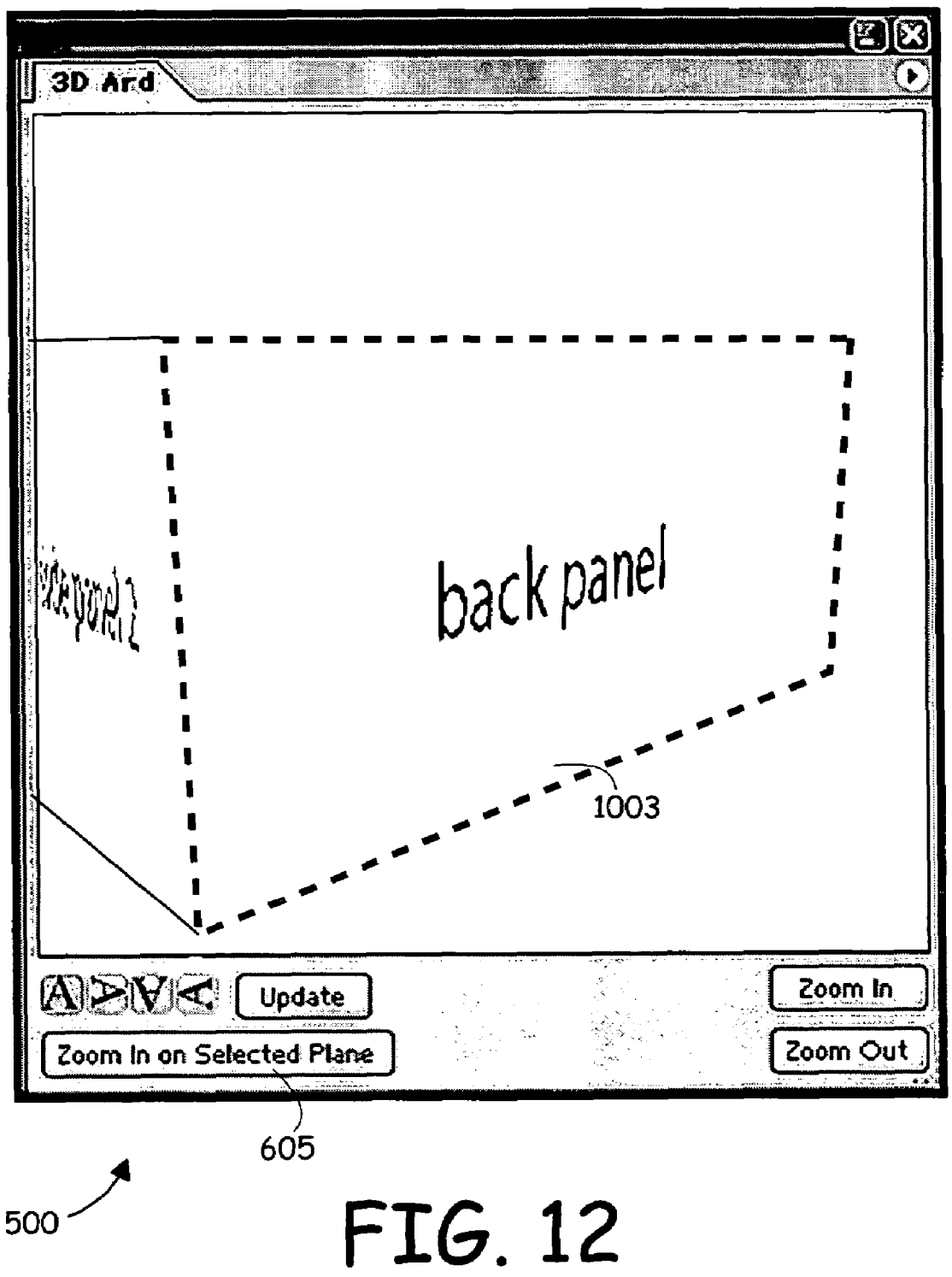
FIG. 12 shows, as an example, a perspective view of the 3D carton with a flap selected, according to an aspect of the invention.
Figure 13:
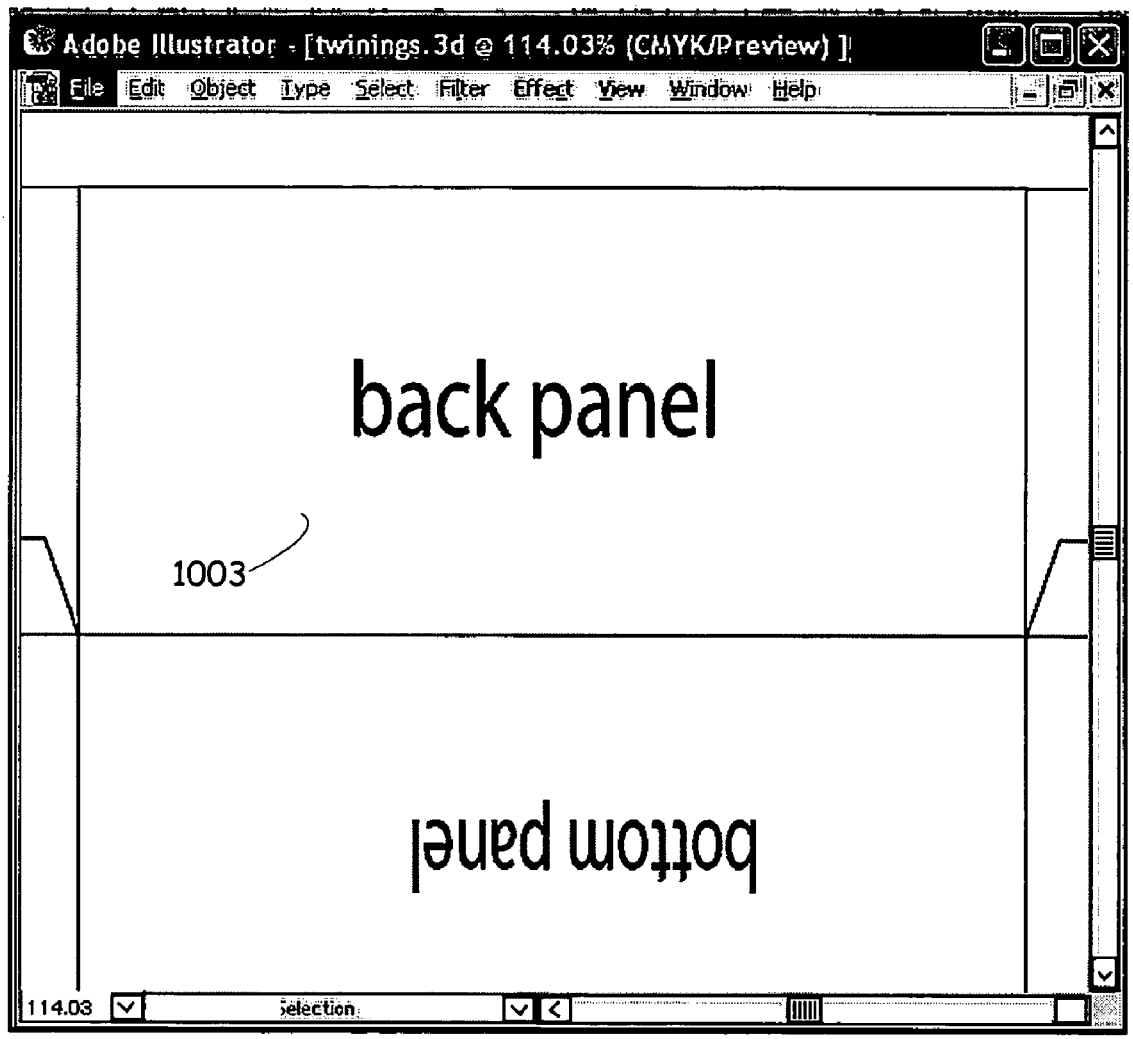
FIG. 13 shows, as an example, a 2D unfolded view temporarily rotated so that the selected panel is displayed in the same orientation as shown in the 3D perspective display of FIG. 12.

In this example, the final 2D unfolded view 400 and 3D view 500 are shown in FIGS. 10 and 11, respectively as 2D design 1000 and 3D design 1100, respectively. Note that the text of back panel 1103 is upside down in the 2D unfolded view 1100, even though it is upright (although invisible) in the 3D view 1000. Consider rotating the 3D view to generate the view shown in FIG. 12, and selecting this panel, so that the panel 1003 is shown with a broken line outline in FIG. 12. Suppose the user indicated, by pressing the "Zoom in on selected plane button" 605 that he or she wishes to view this panel in 2D, e.g., for possible design editing. The resulting 2D unfolded display as shown in FIG. 13 is of the 2D unfolded design 1000 temporarily rotated so that the panel 603 is displayed right side up, e.g., in the same orientation as shown in the 3D display of FIG. 12, rather than upside down as shown in FIG. 11.

Figure 14:
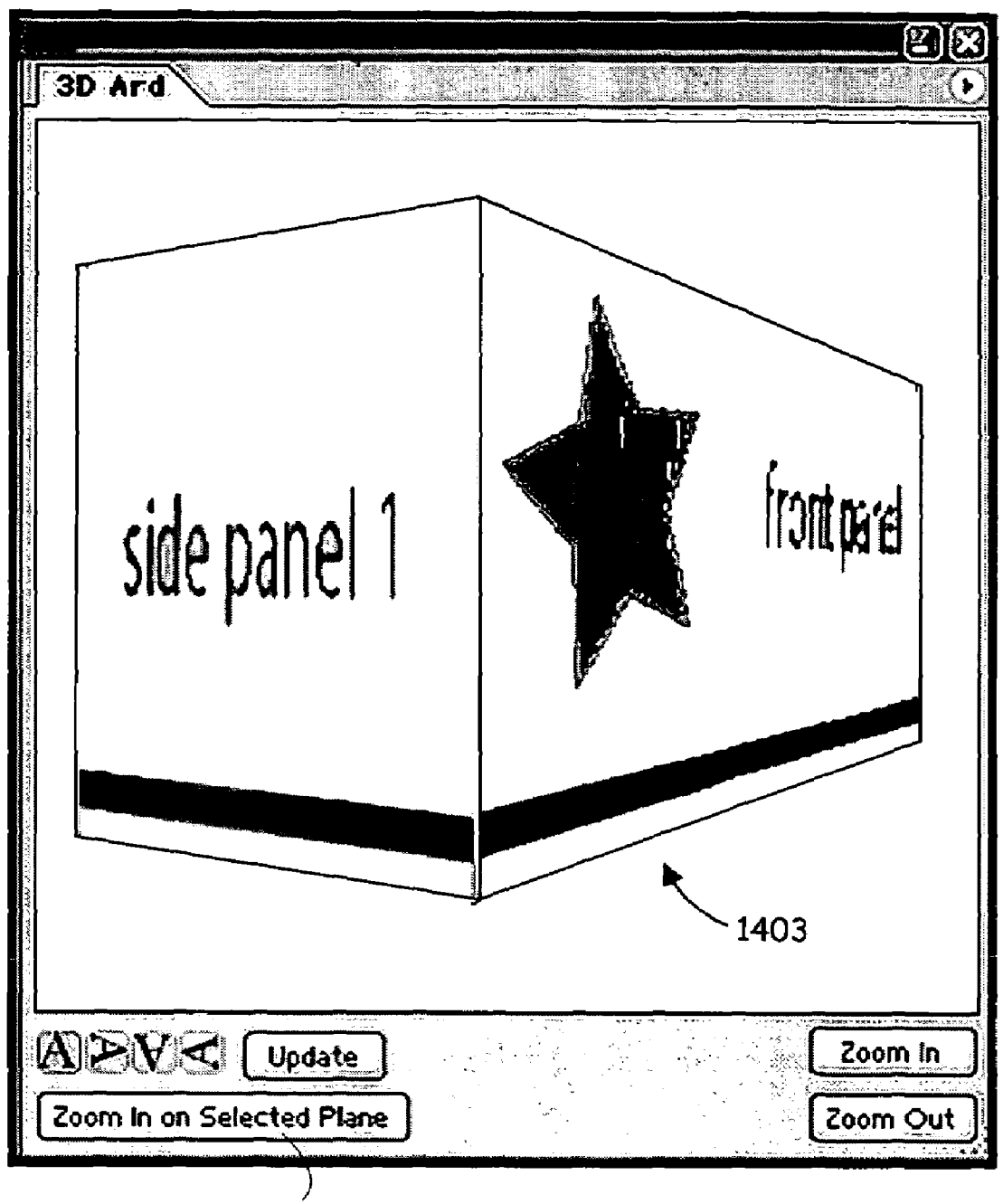
FIGS. 14 and 15 respectively show a perspective view of the 3D carton, and the corresponding 2D unfolded view of the same carton, with graphics extending over more than one flap.
Figure 15:
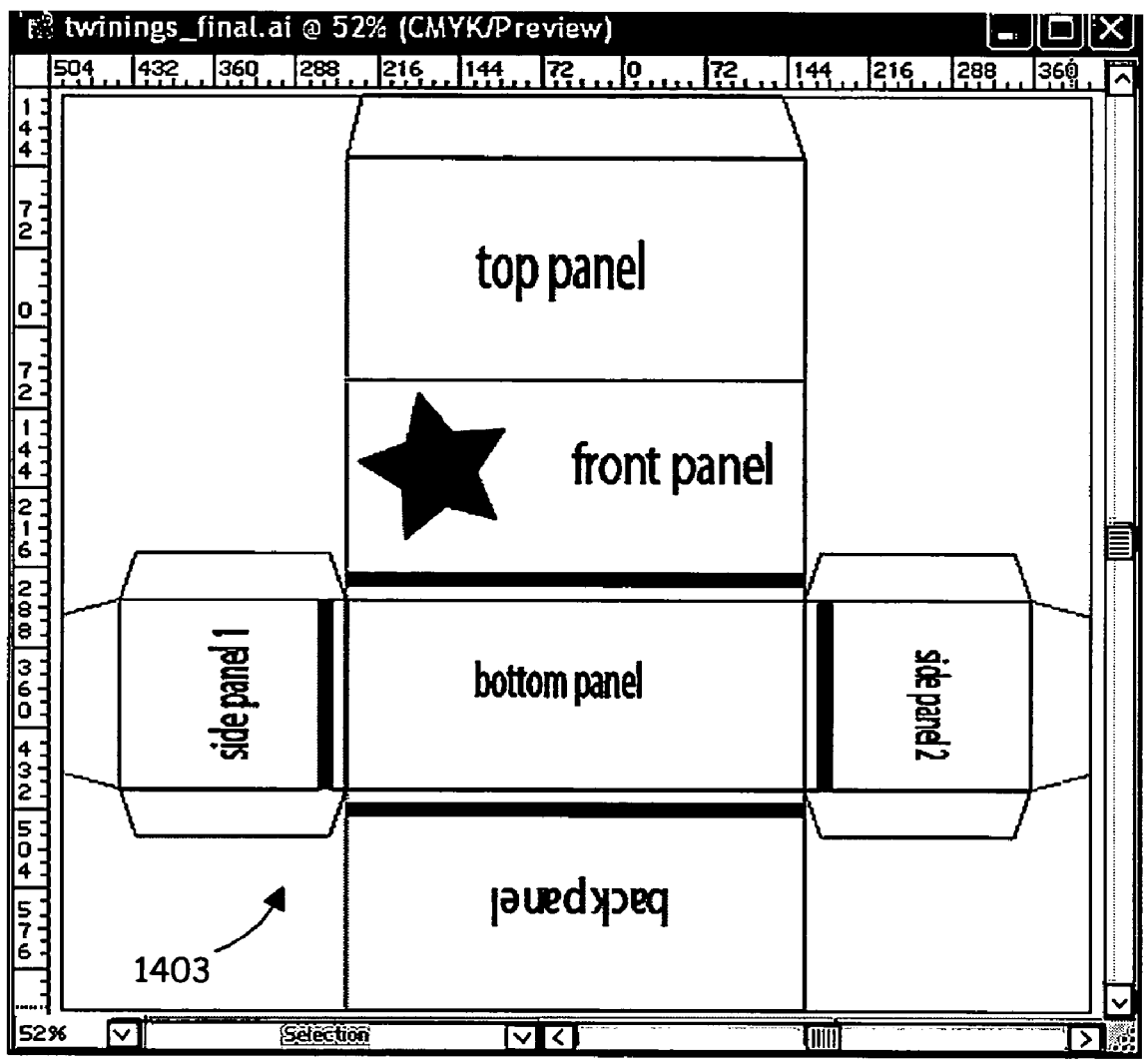

Another aspect of the invention (block 217 in FIG. 2) is the provision of 3D guides (also called 3D guide lines) to aid in the design process, in particular, to ensure image continuity in 3D of an image that extends over different panels. 3D guides will now be explained with aid of an example. Suppose that a user wants to add a thick black line that goes across side panel 1, front panel, side panel 2 and the back panel of the example carton. FIGS. 14 and 15 respectively show the 3D view and 2D unfolded view of the desired carton 1403.

The design process includes designing one flap at a time. Without some tool, it is not easy to place designs that overlap over several flaps, such as the black line in carton 1403.

One aspect of the invention is that a user can place a guide line on a selected flap of the 2D unfolded view. In one embodiment, this may be either after selecting a flap, or in the overall 2D unfolded view. In another embodiment, the user first selected the flap, and in yet another embodiment, the user directly places the guide line on the overall 2D unfolded view, and the method determined which flap this line is on. The guide line can be horizontal, or vertical, or any arbitrary orientation desired by the designer to aid in the design process. Furthermore, in one embodiment, only part of a guide line on the flap is drawn, and the method automatically extends the guide line to the edges of the flap.

Figure 16:
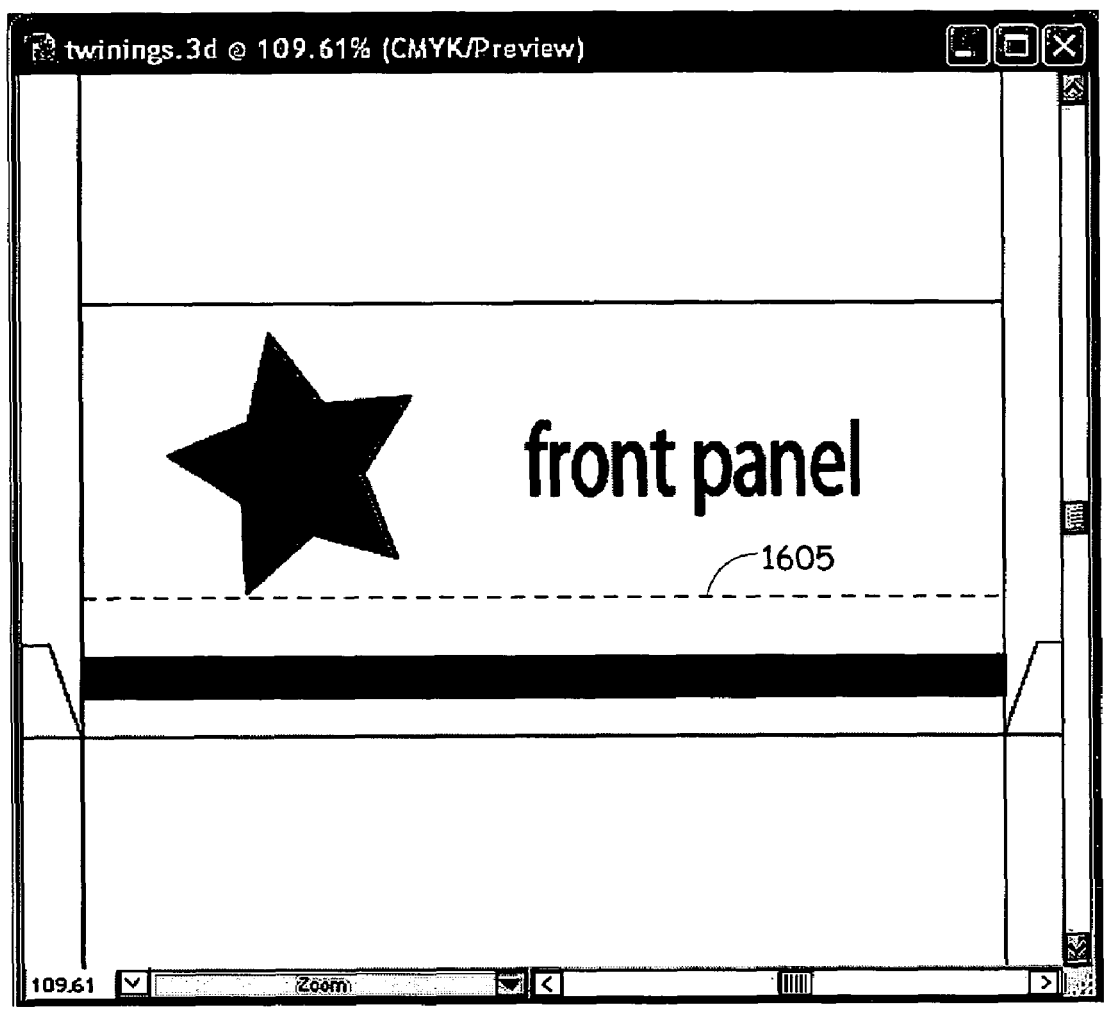
FIG. 16 shows, as an example, a guideline on a 2D zoomed view of a selected face or flap of a carton, according to one aspect of the invention.

Continuing with the exemplary carton, FIG. 16 shows one such guide line 1605 on a 2D zoomed view of a selected face or flap. In one embodiment, the guide lines are displayed in a distinct visible color. In the drawings included herein, a broken line is used to show the guide lines.

Note that in the example of FIG. 16, the guide line is a straight horizontal line. Embodiments of the invention also provide for curved guide lines and also any straight lines at any angle forming guide lines.

Defining such a guide line on a flap defines a guide surface that may be horizontal or vertical depending on the orientation of the flap and/or the guide line, or perpendicular to the flap in the 3D model of the carton. In the case of the guide line being a straight line, the guide surface is a guide plane. The method includes from, the initial guide line, ascertaining which flap the line is on in the case that the defining of the line was not after selecting a flap, and further includes determining the 3D guide surface that includes the defined line as an intersection of the guide surface and the selected or ascertained flap.

Once the guide surface is determined, the method determines intersections of the guide surface on one or more other visible flaps, i.e., the other flaps that are part of the outer surface of the carton, and forms guide lines thereon. Typically, the method determines the intersections with all other visible flaps. The 2D unfolded view and the 3D model are updated to include the guide lines. Thus, 3D guide lines are formed in the 2D unformed view and in the 3D view of the carton.

Figure 17:
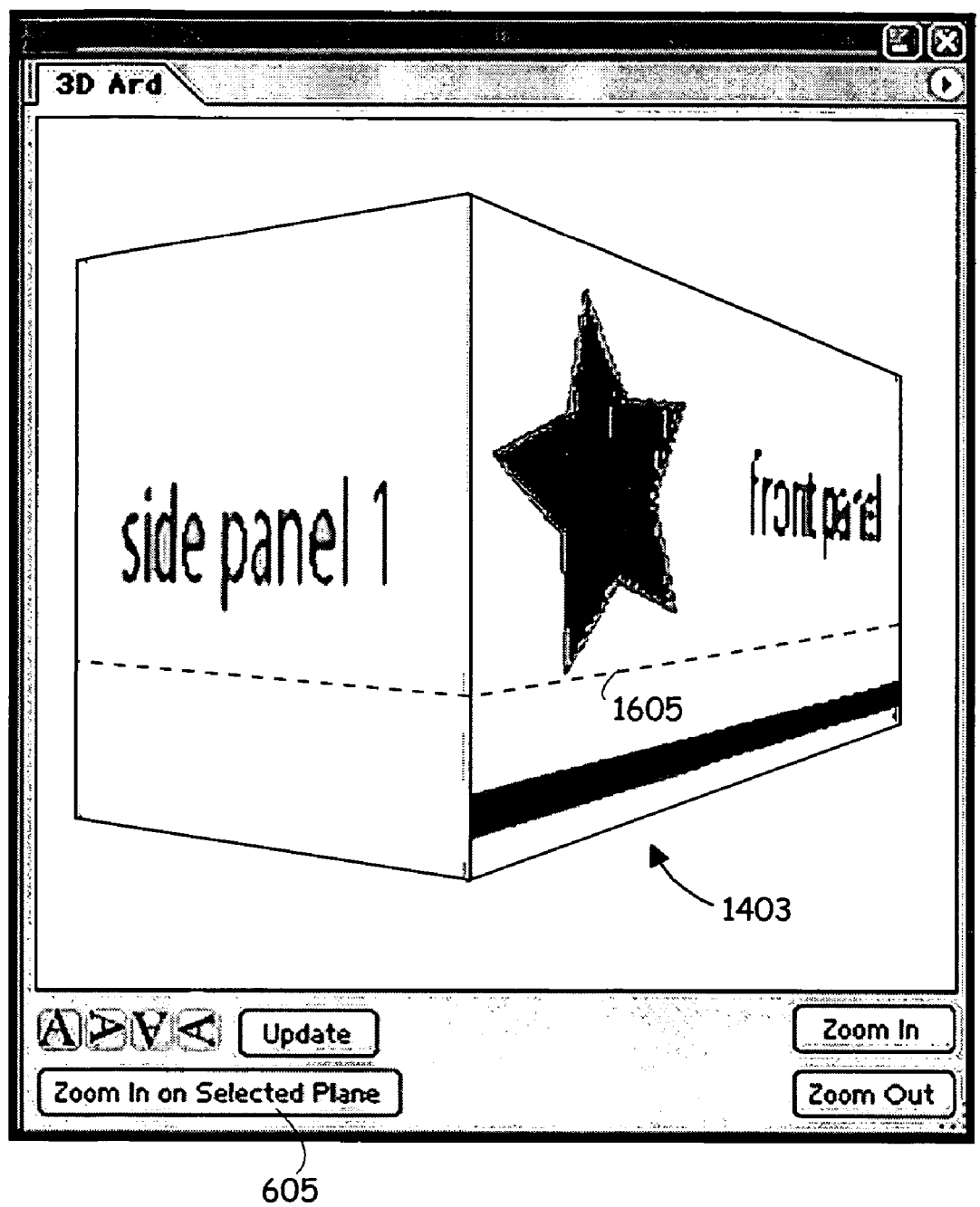
FIG. 17 shows, as an example, the 3D view of the carton shown in FIG. 16, with the guidelines shown on all the visible flaps, according to one aspect of the invention.
Figure 18:
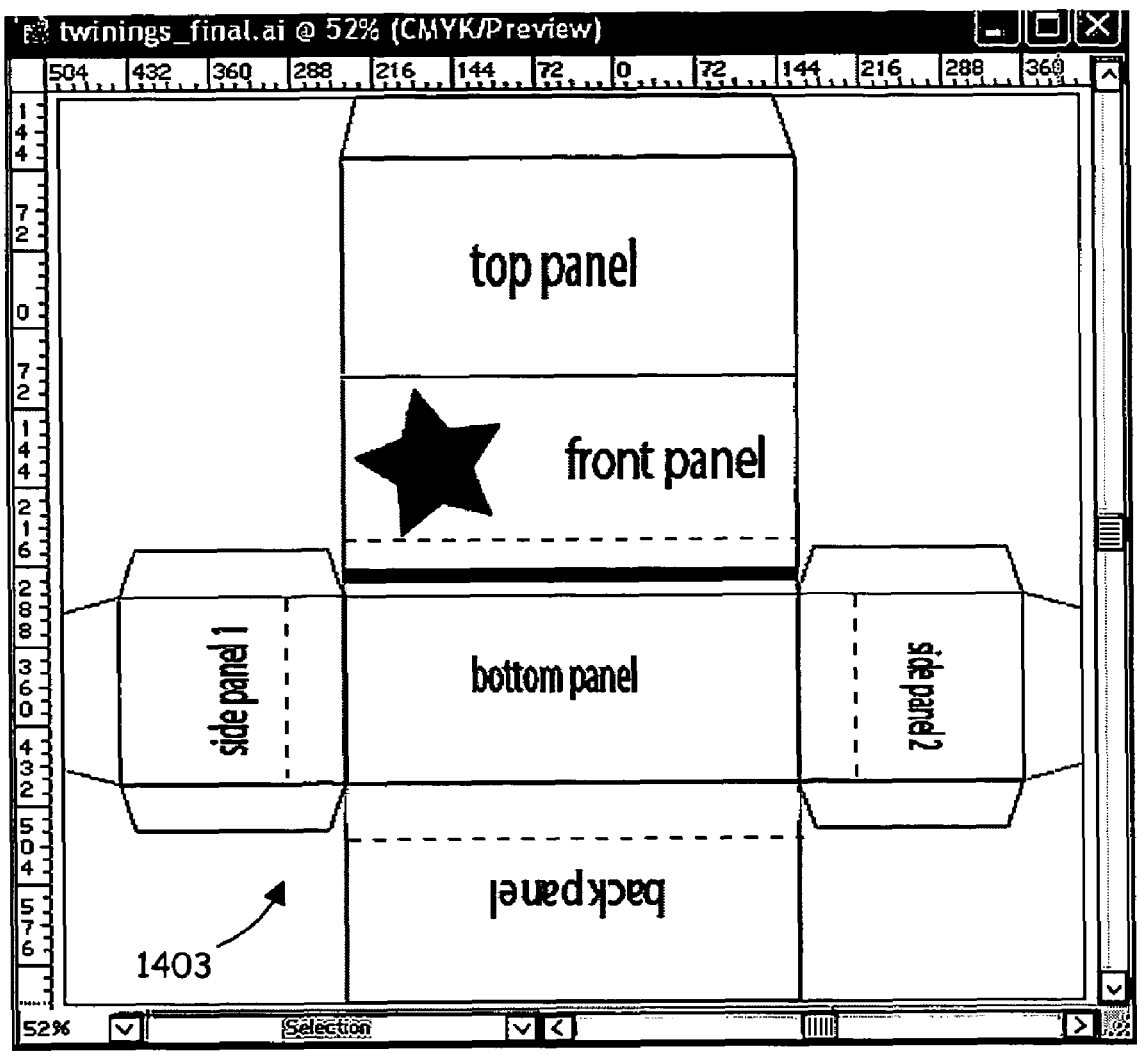
FIG. 18 shows, as an example, the overall 2D unfolded view of the carton with the guide lines shown on all visible flaps.

In one embodiment, the guide surface is planar, so is a guide plane. This is the example starting with FIG. 16. FIG. 17 shows the 3D view of the carton with the guide lines on all the visible flaps, and FIG. 18 shows the overall 2D unfolded view with the guide lines shown on all visible flaps.

The guide lines shown on the 2D unfolded view provide an aid for the designer to properly align graphics on each face, for example, so that there is continuity on a graphic that extends over more than one flap.

As an example, suppose that the thick black line on the front panel is to be shown on the back panel and two side panels, as shown in FIGS. 14 and 15.

Figure 19:
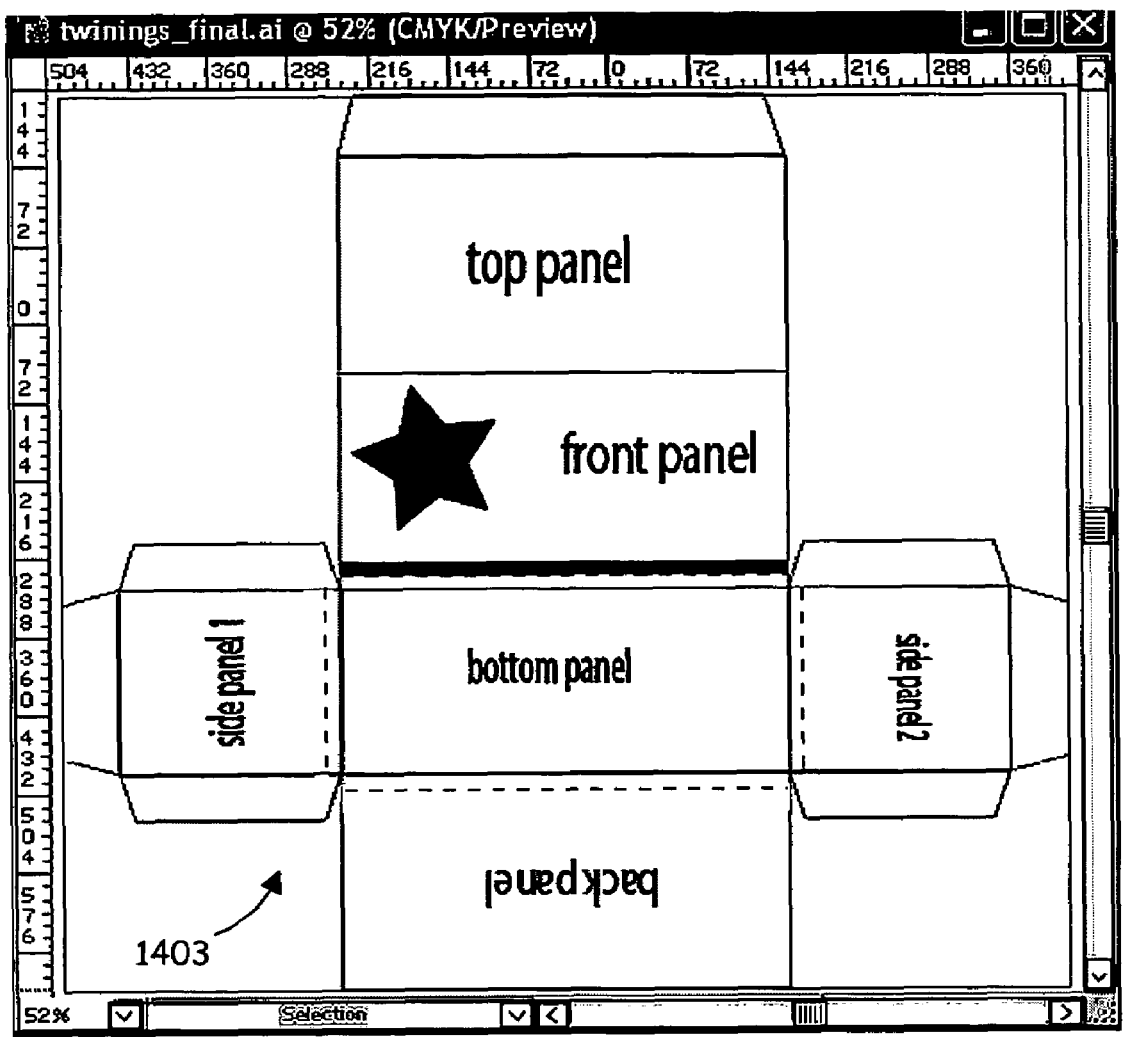
FIG. 19 shows, as an example, a 2D unfolded view after a guide plane, in the form of one of the guide lines, was moved to be aligned with the bottom of the thick black line graphic element, according to an embodiment of the invention.

Using the 2D unfolded view, e.g., the 2D zoomed view, or using the 2D unfolded view, a user may select and move or rotate the guide plane so that the guide line is aligned with a desired location, e.g., a location to guide placement of a graphic element. FIG. 19 shows a 2D unfolded view after guide line 1605 was moved to be aligned with the bottom of the thick black line. The thick black lines may now be added to the other three panels, e.g., in the case that the width/thickness of the black line is known.

Figure 20:
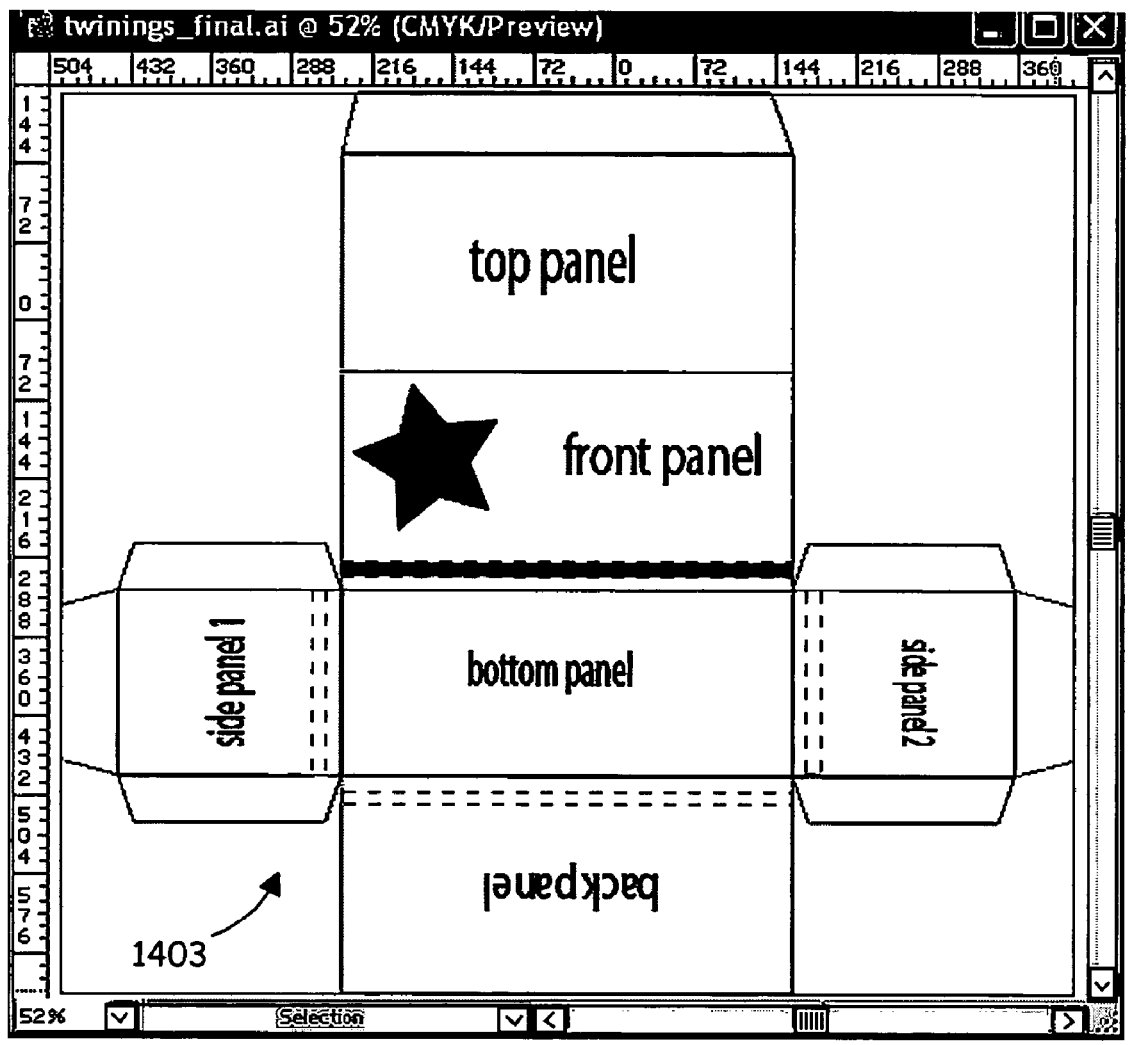
FIG. 20 shows, as an example, a 2D unfolded view with the result of adding a second set of guidelines, according to an embodiment of the invention.

More than one guide plane of guide lines may be added and manipulated. For example, in the case that the thickness of the black line added to the front panel is not known, further guide lines may be added to provide a guide for the thickness of the other black lines to be added to the other flaps. FIG. 20 shows the result of adding a second set of guide lines, such that the guide line of the second set on the front panel is aligned to the top of the thick black line. The black lines may now be added, one flap at a time using, e.g., zoomed 2D unfolded views of each flap. The result will be the design shown in FIG. 14 in 3D perspective form, and in FIG. 15 in 2D unfolded form.

Some details of the designing of the graphics on each flap have not been included for the sake of brevity, and for such details, the reader is referred to co-assigned US Patent application publication US 20050157342 to inventor Bru. For example, during placement of a design on a selected flap, since the graphic artist knows from information provided at 203 the sequence by which the panels and flaps are to be folded, clipping masks can now be defined. Such masks can avoid printing on regions of substrate material that will ultimately be covered as the result of a folded-over overlying regions of panel or flap material. Printing resources can thus be conserved, print bleeding can be minimized and glue results can be optimized.

At this juncture the graphics artist has prepared what he or she believes to be a computer-generated graphics file representing images to be printed upon and cover, in proper orientation, size, and alignment, relevant portions of the carton panels and flaps. Referring again to the flow chart of FIG. 2, in 219 the graphics artist may view a computer-generated 3D image of the carton with the graphics placed thereon, and visually confirm such aspects as the alignment and size of graphics, the esthetics, and correct graphics as required. Using one of the computer input devices, the graphic artist can manipulate (e.g., rotate, resize, etc.) the computer displayed image of the carton to view the various panels and flaps. The confirming of proper graphic alignment may be especially important in the case that adjacent portions of panels and/or flaps bear a sub-portion of an overall image that should appear in good alignment on the carton surface.

After making such adjustments to the graphics as appear necessary, the graphics artist allows the method to create, in 221, a computer-generated output graphics file. This output file can then be provided as graphics input to a system or portions of a system used to print and then fabricate the desired cartons.

Some technical details of some of the aspects described above are now provided.

Computer Representation of the Carton

Generating a 3D model of the carton and viewing a computer-generated image of 3D folded carton (207 in flow chart 200) includes using the structural information input in 203 to form a 3D model of the folded carton. This 3D model is maintained in memory of the computer system.

In one embodiment, the 3D model is represented in memory by a C++ object of class Solid. A Solid has the following characteristics:

A Solid has several Surfaces. A Surface has several Triangles. A Triangle has three Vertices. A Vertex has (X,Y,Z)-coordinates (also called 3D coordinates), and (u, v)-unfolded-view coordinates, also called 2D unfolded view coordinates, or simply 2D coordinates. The (X,Y,Z)-coordinates describe a point in 3D and the (u, v)-unfolded-view coordinates describe which point in the 2D unfolded view corresponds to the 3D point (X,Y,Z).

In more general terms, the method includes forming a 3D model of the carton, and maintaining a representation of the 3D model. The representation of the 3D model includes surfaces that have elemental surfaces, e.g., triangles. Each elemental surface is defined by a set of points, e.g., vertices of a triangle in the case of triangles. The method includes maintaining a correspondence between the 3D view and the 2D unfolded view of a carton by maintaining a correspondence between the 3D coordinates and the 2D unfolded view coordinates of the set of points of the elemental surfaces.

The method further includes maintaining for the 3D model an indication of which surfaces in the 3D model are horizontal and which surfaces are vertical. In one embodiment, the method maintains with an object Solid, e.g., maintaining in memory with the 3D model, a structure, e.g., an up vector that indicates which surfaces in Solid are horizontal and which surfaces are vertical.

To generate a view for display, the 3D Solid is projected from a selected camera position onto a projection plane. How to so project is a computer graphics technique well known to those in the art. In one embodiment, the drawing being put onto the display of the 3D projection is carried out using OpenGL calls. OpenGL is a well-known software interface (an API) that includes an interface to several hundred computer graphic functions, including shaded graphics. See for example, www.opengl.org.

In one embodiment, generating new views from different angles is carried out by changing the camera position.

Temporarily Rotating the 2D Unfolded View

Temporarily rotating the 2D unfolded view (item 215 in flow chart) is in order to facilitate adding graphics the right way up to a flap. By temporarily rotating is meant rotating the view only. The data representing the 2D unfolded model of the substrate remains stored in an unaltered orientation. The rotation facilitates the drawing and adding of graphical elements that would not be the right-way-up if the complete 2D unfolded view is the right-way-up.

Note that it is possible to permanently rotate the representation of the 2D unfolded substrate. This has the disadvantage that while a desired flap may be rotated to aid design of that flap, other flaps would then be rotated in the wrong way.

In one embodiment of the present invention, by clicking on the "Zoom In on Selected Plane" button 605 after selecting a flap (see FIG. 6), the user can cause the entire 2D unfolded view to be rotated 90, 180 or 270 degrees as required. The method includes maintaining a data structure representing the 2D unfolded model and the view thereof. The data structure includes a tag indicating the amount of rotation.

In one embodiment, when the method, e.g. on user command, saves the data of the 2D model into a file in the storage system of the computer system 300, the tag is read and the rotation reversed, so that the file stored is in non-rotated form.

When a user selects a flap in the 3D image 500 of the folded carton, and then clicks in the zoom button 605 (FIG. 6), the method includes determining the orientation of the flap in the three-dimensional view, which will ascertain how the entire 2D unfolded view is to be rotated.

For this, when the user clicks on the 3D display 500, the known technique of ray tracing is used to determine which elemental surface, e.g., triangle of the Solid model of the carton intersects with the ray originating from the camera position through to the clicked point on the display plane. The so-determined triangle belongs to a surface. This is the surface of the selected flap.

Once the flap is determined, the method calculates the required rotation of the selected flap surface in such a way that lines that are vertical in the 3D view are also vertical in the 2D unfolded view.

Figure 21:
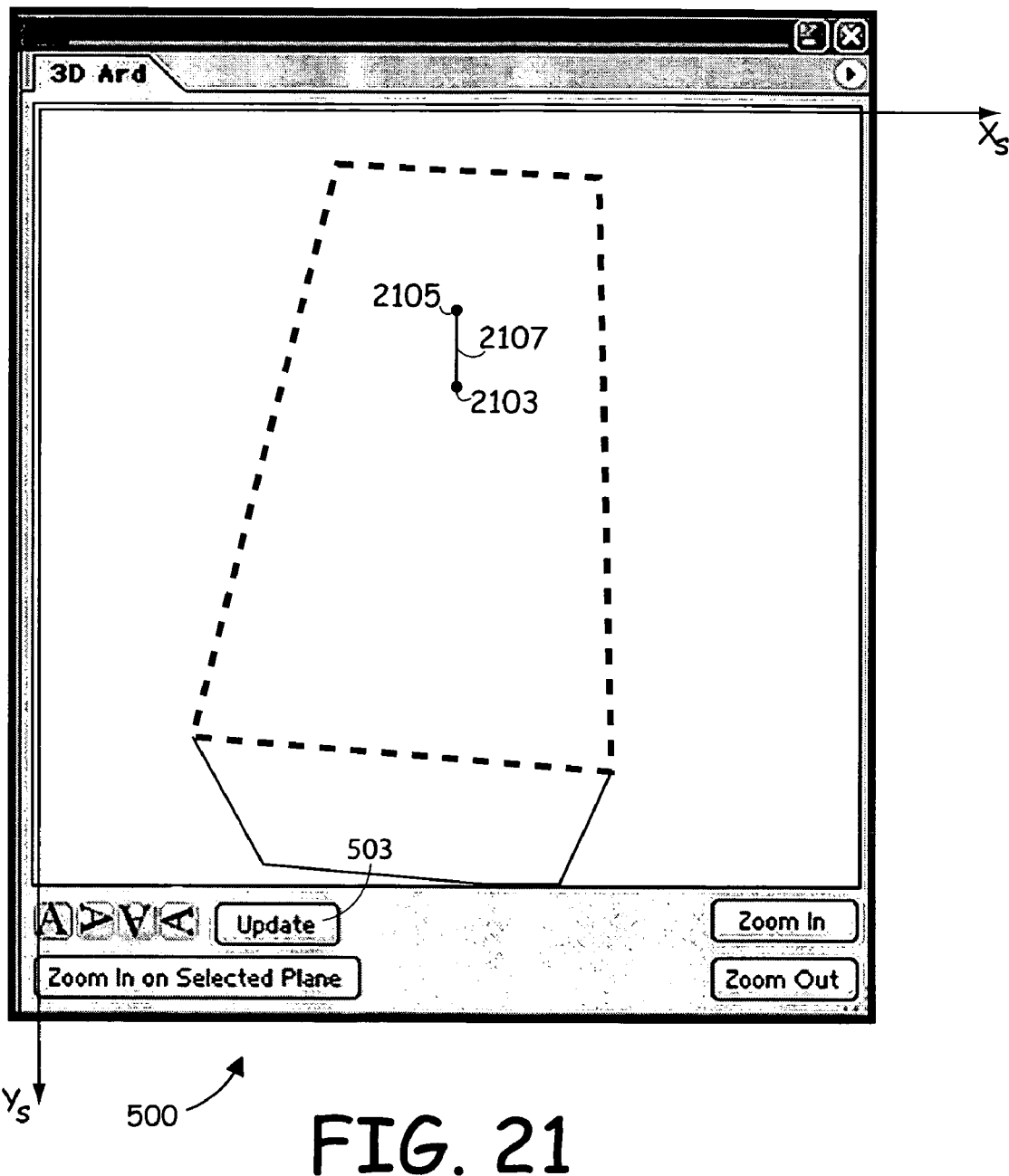
FIG. 21 shows a perspective 3D view of a carton at some viewing angle related to a camera position, with a small vertical line, and is used by way of example to describe an aspect of the present invention.

FIG. 21 shows a 3D view at some viewing angle related to a camera position. For this view, FIG. 21 shows the screen $X_S$, $Y_S$ axes. Consider a small vertical line 2107. Suppose the user clicks on a point shown as 2103 of the vertical line 2107 in the 3D view. In the coordinate space of the 3D view—we call these the screen coordinates, according to the shown $X_S$- and $Y_S$-axes in the FIG. 21. Now add another point 2105 that is vertically just above point 2103, so having the same $X_S$-coordinate as 2103, and a slightly smaller $Y_S$-coordinate than point 2103.

To determine the orientation of the same line 2107 in the 2D unfolded view 400, the method determines the coordinates in the 2D unfolded view of the same two points 2103 and 2105. One embodiment uses ray tracing to determine with which triangle or triangles points 2103 and 2105 intersect in the 3D model. This provides the 3D (X, Y, Z)-coordinates of the intersection points. The method uses texture mapping to determine the (u, v)-coordinates of the intersection points in the 2D unfolded sheet.

In more detail, each intersection point corresponding to 2103 and 2105 belongs to a particular triangle of the 3D model of the carton. The vertices of the triangle are mapped to (u, v) coordinates in the 2D unfolded view for the triangle. For each intersection point, the method includes interpolating between the 2D (u, v)-coordinates of the vertices of the triangle to determine the 2D (u, v) coordinates in the intersection point. One embodiment of the interpolation includes calculating the barycentric coordinates of the intersection points. Such and other interpolation methods are known to those in the art of computer graphics.

Figure 22:
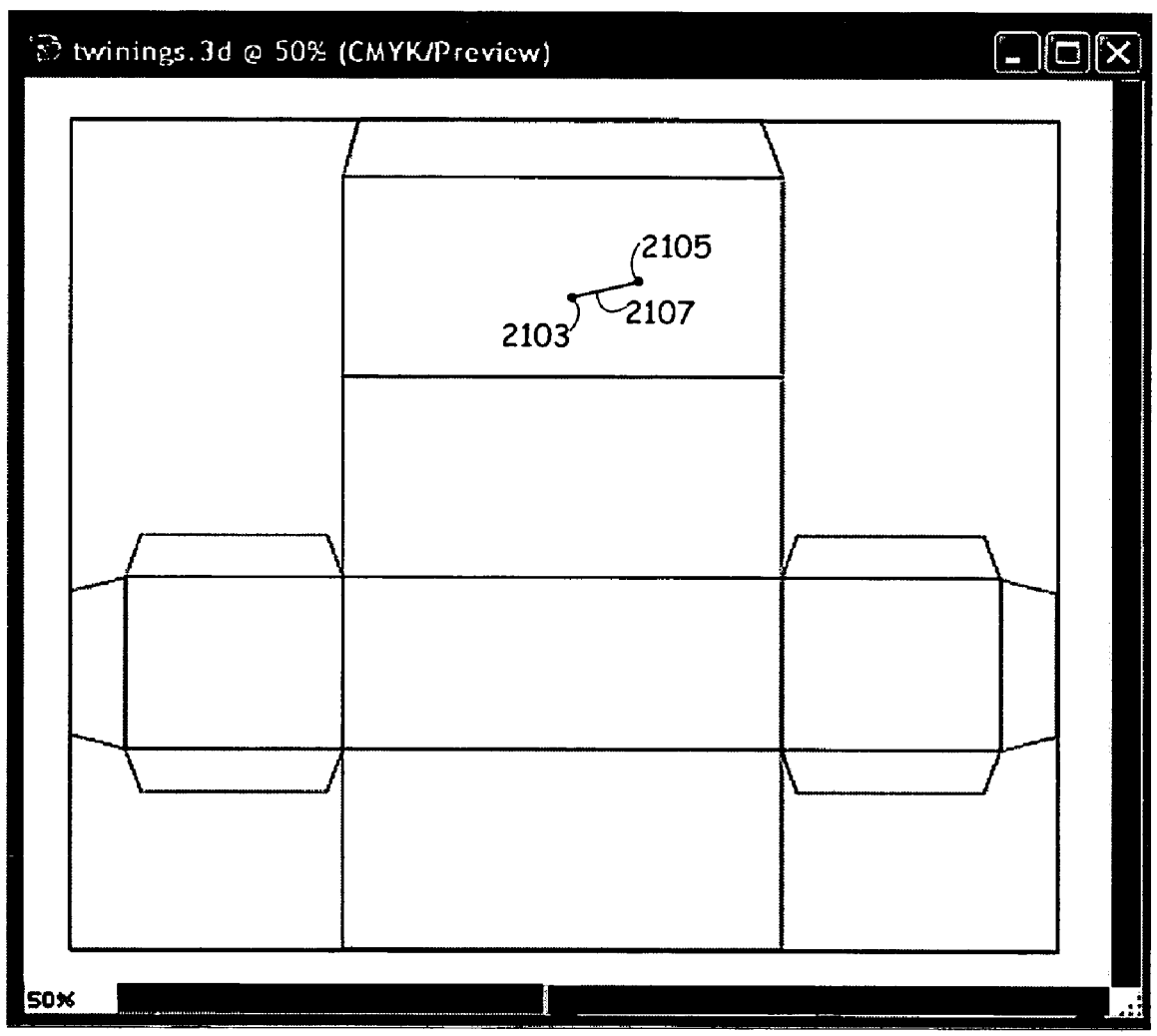
FIG. 22 shows the two endpoints of the line shown in FIG. 21 in a 2D unfolded view of the carton, and is used to illustrate an aspect of the present invention.

FIG. 22 shows the two points 2103 and 2105 and the line 2107 on the 2D unfolded view of the carton after the (u,v) coordinates have been determined. From FIG. 22, it can be seen the vertical line in the 3D view becomes an almost horizontal line in the 2D unfolded view of the carton. The 2D model would need to be rotated 90 degrees counter-clockwise so that what is vertical in the 3D view appears the right way up in the 2D unfolded view.

3D Guides

Figure 23:
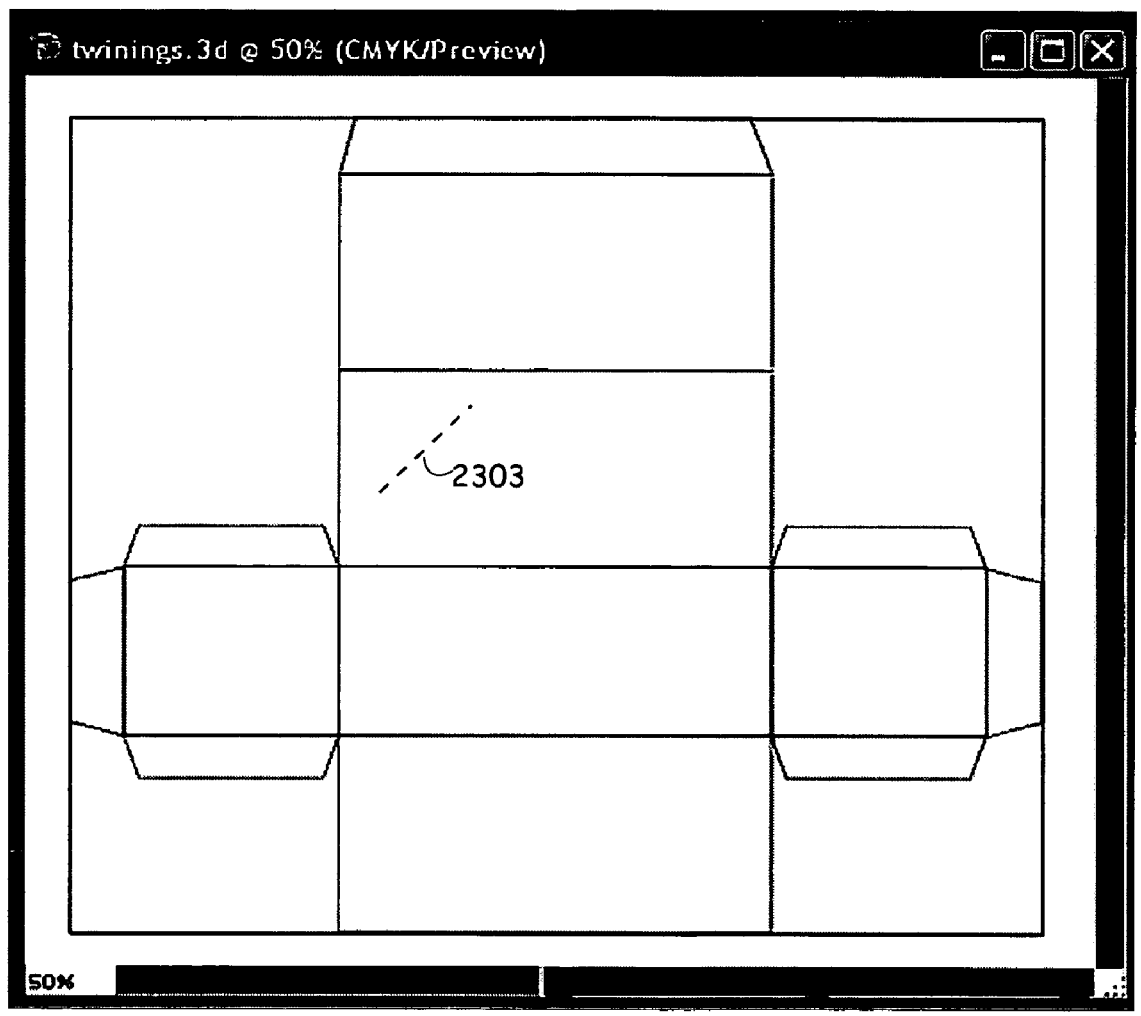
FIG. 23 shows a 2D unfolded view with a line drawn in order to define a 3D guide, according to an aspect of the present invention.

By a 3D guide is meant a guide surface, e.g., a guide plane in 3D with the associated set of guide lines. The case of guide plane will be described here in more detail. In one version, to define a 3D guide, a user draws a line in one of the flaps of the 2D unfolded view. FIG. 23 shows a 2D unfolded view with a line 2303 drawn in. The drawn line is a segment of the guide line on the flap. Note that in an actual implementation, this line may be added in the zoomed view of the flap and in other views. Furthermore, note that in an actual implementation, the line would appear on the screen in a color rather than as a broken line as in FIG. 23.

Drawing such a guide line segment provides two (u,v) coordinates on the 2D unfolded sheet. The method uses these two (u,v) coordinates defining a line on the intersection of the desired guide plane with one of the flaps to determine which flap in the 3D model the guide line segment is on.

Determining which flap in the 3D model the guide line segment is on includes the following pseudocode,

---

Until the flaps for the endpoints of the guide lines segment points are determined:
  For each of the triangles of the Solid defining the carton,
  determine which triangle(s) the endpoints of the guide line
  belongs to as follows:
    Using the (u, v) coordinates of the vertices of the
    triangle, calculate the barycentric coordinates of the two
    endpoints of the guide line segment.
    Ascertain if either of the endpoints belong to the
    triangle. The ascertaining uses the barycentric
    coordinates. Suppose the barycentric coordinates are
    denoted (s, t). If both s and t, and also s + t for any point
    is in the [0.1]-interval, then the corresponding point
    belongs to the triangle.
    If the points do not belong to this triangle, continue with
    the next triangle.
  Each triangle belongs to a surface, so determining the
  triangles to which the endpoints belong to determines the
  surface (or flap) the endpoints belong to

---

Figure 24:
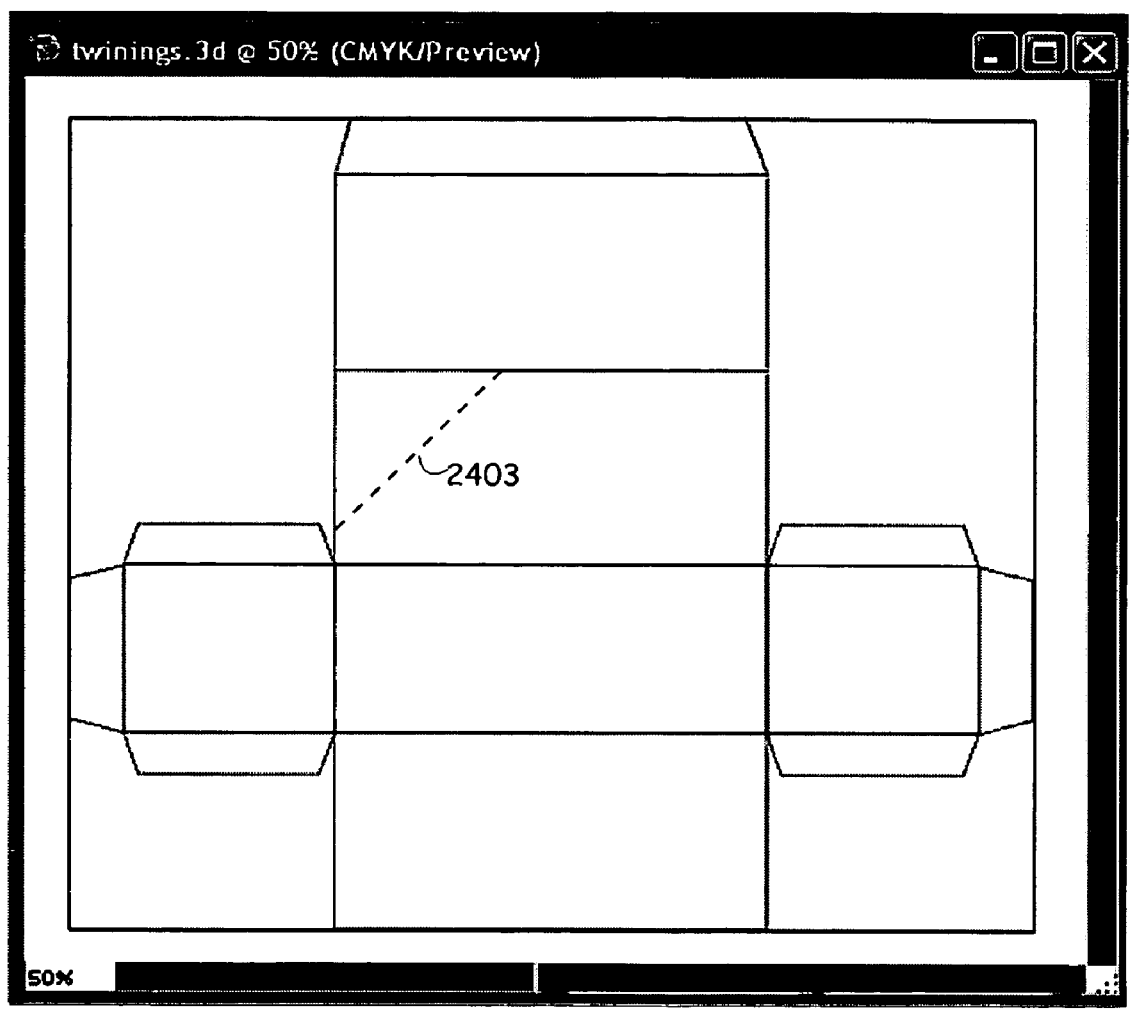
FIG. 24 shows the line in FIG. 23 extended to become a guideline line on the flap of interest according to an aspect of the present invention.

The method further determines, from knowledge of which flap the guide line belongs to, the intersection points of the guide plane with the outline of the flap to determine the complete guide line on the flap. FIG. 24 shows the original line 2303 extended to become guide line 2403 on the flap of interest.

The method further includes determining the guide plane, having as input the guide line on the flap, and the flap this guide line belongs to. The line is defined by the two intersection points on the line. These intersection points are denoted as vectors p1 and p2, as calculated above. These intersecting points are available in (u,v)-coordinates, and from knowledge of the triangles of the Solid, and the vertices, also in (X, Y, Z)-3D coordinates.

From this information, the guide plane is determined. The guide plane in 3D is fully defined, for example, by the vector that is normal (perpendicular) to the guide plane, and by the distance of the guide plane along this normal.

The following pseudocode describes a decision tree by which the normal of the guide plane can be determined according to one embodiment of the invention.

```
If the flap on which the guideline was drawn is more or less
  horizontal, then
    the guide plane is vertical and the guide normal horizontal
  Else
    If the guide line itself is horizontal in 3D, then
      the guide plane should be horizontal and the guide normal
        vertical
    Else (if the guide line is not horizontal, and the flap is not
      more or less horizontal), then
        the guide plane should be perpendicular to the flap
```

Recall that in one embodiment, an up vector is maintained with the Solid object of the carton. The up vector points up, so determining which surfaces are horizontal and which surfaces are vertical. A flap or surface is more or less horizontal if the normal of that surface is approximately parallel to the up vector defined in the Solid. The three vertices of a triangle of the surface provide for calculating the normal of the surface. Ascertaining if this normal is more-or-less parallel to the up vector is carried out by ascertaining if the dot product of this normal with the up vector of the Solid is approximately ±1, e.g., in one embodiment, has magnitude greater than 0.99. Furthermore, a line is ascertained to be horizontal if the dot product of the line of interest and the up vector is 0, e.g., in the case of the intersection points, if the dot product of the vector resulting from subtracting p1 from p2 and the up vector is 0.

The calculation in the following is carried out with the (X, Y, Z)-coordinates of the intersection points.

In one embodiment, denoting the dot product operator by · and the cross product operator by ×, the method determines if abs(normal_of_flap·up_vector)>0.99.

If so, the normal of the guide plane, denoted normal_of_guide, is normal_of_guide=(p2−p1)×up_vector.

Else, if the above absolute value is less than or equal to approximately 1, e.g., 0.99, then the method determines if (p2−p1)·up_vector=0.

If so then normal_of_guide=up_vector.

Otherwise, denoting the normal of the flap by normal_of_flap, normal_of_guide=(p2−p1)×normal_of_flap.

The distance of this guide plane along normal_of_guide, denoted distance_of_guide is distance_of_guide=p1·normal_of_guide.

Calculation of Intersection Lines of Guide Plane with the 3D Model

Once the guide plane is determined, the method ascertains if there are intersection points of the guide plane with the outlines of all the flaps of the carton. For such ascertaining, in addition to normal_of_guide and distance_of_guide, one embodiment uses an outline of a surface in the form of a line of two points, denoted by vectors q1 and q2. The line can also be described parametrically as the set of points q=q1+t*(q2−q1), with t a parameter that varies between 0 and 1.

Suppose that there is an intersection point between the line and the guide plane, and denote this point p. p lies on the guide plane. This means that the distance of the intersection point p to the guide plane is 0. Therefore, p· normal_of_guide—distance_of_guide=0

Furthermore, p is a point of the outline, so there is a value of t such that p=q1+t*(q2−q1)  (2)

The method includes solving these equations. If there is a solution for t between 0 and 1, then there is an intersection point.

The ascertaining of whether there is an intersection is repeated for each outline of each surface, and results in a set of intersection lines. For each of these intersection lines, both the (X,Y,Z)-coordinates and the (u,v)-unfolded-view coordinates are known or are readily determined.

From these coordinates, the method includes drawing the intersection lines in the 2D unfolded view, and further, drawing any visible parts of the intersection lines in the perspective 3D view of the carton.

Invisible Flaps

One aspect of the invention includes providing for a user the ability to select a flap that is invisible in the 3D model because one or more other flaps hide the invisible flap from view. Different embodiments of the invention include one or more of animation of the perspective 3D view, the ability to make a flap invisible to see underneath such a flap, and adding transparency to the perspective 3D view.

In one embodiment, animation is added in the perspective 3D view, such that the user can view the design in a half open state in which invisible flaps become visible.

In one embodiment, a selected flap can be made invisible to provide a view of any otherwise invisible flaps that are underneath the flap just made invisible.

In one embodiment, a view having transparency may be selected for the perspective 3D view, such that invisible flaps underneath visible flaps may be seen. The user can then select such an invisible flap, e.g., by double clicking on a pointing/selection device such as a mouse, or by right clicking on a pointing/selection device having a left and a right button, such as a mouse having at least two buttons.

Panels Consisting of More than One Flap

Figure 25A:
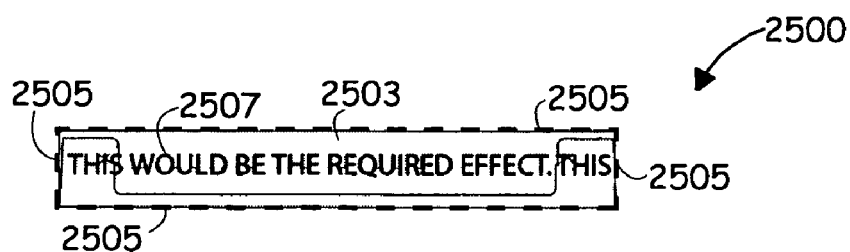
FIG. 25A shows an exemplary panel made up of several flaps, parts of which are invisible, on which graphics have been added according to an aspect of the present invention.

Some panels of the carton are made up of more than one flap. In one embodiment when a user selects a flap that is part of a panel that is made up of more than one flap, and the "Zoom In on Selected Plane" button 605 is clicked in the 3D perspective display 500, not only is the selected flap shown, and rotated so that graphic element(s) may be added the right way up, but also the complete panel of the carton is displayed, e.g., as an outline in the 2D unfolded view. This part of the panel is displayed in the form it would appear in the 3D folded carton. For example, FIG. 25A shows a panel 2500 made up of several flaps, parts of which are invisible. Suppose the flap 2503 is selected, e.g., in the perspective 3D view (not shown) and the "Zoom In on Selected Plane" is asserted. Then in addition to the flap 2503, the complete panel is outlined on the 2D zoomed display. This outline is shown by broken line 2505 in FIG. 25A.

Suppose it is desired to add the graphical element 2507 that has the text "THIS WOULD BE THE REQUIRED EFFECT. THIS" not only onto the selected flap 2503, but also so that the graphical element is shown on the panel including the visible parts of the other flaps of the panel, as shown in FIG. 25A.

One aspect of the invention is that by placing the graphical element 2507 such that the part that is on the selected flap is accurately placed, the method can automatically distribute the parts of the graphical element 2507 that are on flaps of the panel other than the selected flap onto the corresponding flaps, including transforming each part of the graphical element 2507 so that it is correctly oriented and matched in the folded carton.

Figure 25B:
FIG. 25B shows how part of the graphics shown in the exemplary panel of FIG. 25A are distributed amongst the flaps making up the panel, according to an aspect of the present invention.

FIG. 25B shows the part of the unfolded 2D substrate of the flaps 2550 that make up the panel that includes the selected flap 2503, with the text "THIS WOULD BE THE REQUIRED EFFECT. THIS" placed as shown in FIG. 25A. As can be seen, the part of the graphical element 2507 not on the selected flap 2503 has been segmented into segments for each flap, and distributed, in an appropriately transformed manner, to the flaps other than flap 2503 that make up the panel.

How, in one embodiment, the distribution and transformation of the graphical element segments are achieved is described in more detail in the above-referenced, incorporated herein by reference, co-assigned patent application published as US 20050157342.

Thus has been described a computer-implemented method that provides tools for a user to create and manipulate graphics for use on cartons.

Note also that one aspect of the invention is a carton produced as a result of using an embodiment of the computer implemented method described herein.

While aspects of the present invention have been described with respect to creating and manipulating graphics for use on cartons, it is understood that three-dimensional forms other than cartons could instead be used. It is also understood that the carton (or other three-dimensional form) need not be closeable, e.g., if rectangular, the carton may have only five surfaces, e.g., no top surface. For example an inverted, bottomless, pyramid-shaped structure could bear graphics designed according to aspects of the present invention, as could a multitude of other three-dimensional forms that can be created by cutting and folding a planar substrate.

Note that the term "automatically" is used at several points in the description. In some embodiments, the automatic task may be performed after the user commands the system to do so, e.g., by a click on a graphically displayed button, and in other embodiments, the automatic task may be performed with no explicit user command, such as a click on a graphically displayed button. The term automatic and automatically encompass both cases.

Unless specifically stated otherwise, as apparent from the following discussions, it is appreciated that throughout the specification discussions utilizing terms such as "ascertaining," "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "CPU" and "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by a machine which includes a one or more processors that accept computer-readable (also called machine-readable) code containing instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries computer-readable code (e.g., software) including instructions for performing, when executed by the processing system, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute carrier medium carrying computer-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of carton design system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable code for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A computer-implemented method of designing a carton having a plurality of panels, each panel made up of one or more flaps, the method comprising:
   accepting carton structural information corresponding to a carton;
   forming a 2D unfolded model of the substrate that when cut and folded according to the carton structural information forms the carton;
   forming a 3D model of the carton corresponding to the carton structural information;
   displaying on a first display a 2D view of the unfolded carton design;
   displaying on a second display a perspective 3D view of the 3D model of the carton;
   accepting from a user input to manipulate the view of the 3D model on the second display;
   accepting from the user input to select a flap of the carton on the view of the 3D model on the second display;
   as a result of the selecting of a flap, automatically modifying the view in the first display to be of the selected flap shown in an orientation arranged for the user to design the selected flap;
   accepting a design of the selected flap from the user designing using the 2D unfolded view on the first display, including the user placing graphics on the selected flap in the case that the selected flap is one onto which graphics is to be placed;
   modifying the perspective 3D view of the 3D model to include any changes made in the design;
   accepting from the user an indication of the location of a guide line on a flap;
   determining from the indication of the location of the guide line a guide surface such that the guideline is the intersection of the guide surface and the flap;
   determining the intersection of the guide surface and the 3D model of the carton, the intersection defining guide lines on one or more other flaps that are part of the outer surface of the carton; and
   displaying the guide lines on the selected and other outer surface flaps on the 2D unfolded view,
   such that the user can indicate on the perspective view an action to be performed on the 2D unfolded view, such that the user can select a flap for design using the 3D view, such that the user can design the selected flap using the 2D unfolded view, such that the perspective display of the 3D model is updated to reflect a change made in the 2D unfolded view, and such that the user can use the guide lines to align graphics being placed on one or more flaps.

2. A method as recited in claim 1, wherein the automatically modifying the view in the first display is arranged so that display shows the selected flap right side up, including temporarily rotating the 2D unfolded model as required to produce the right side up 2D unfolded view.

3. A method as recited in claim 2, wherein the automatically modifying the view includes determining the orientation of the selected flap in the three-dimensional view to ascertain how the 2D unfolded model is to be rotated.

4. A method as recited in claim 1, wherein the guide surface is a plane, such that the guide lines are straight lines on the selected and other outer surface flaps.

5. A method as recited in claim 4,
   wherein the indication of the location of a guide line on a flap is provided by the user as a line segment of the guide line on the flap, the line segment having endpoints,
   wherein the determining of the guide surface includes:
      using the 2D unfolded coordinates of the endpoints of the line segment to determine which flap in the 3D model the line segment is on;
      determining the intersection points of the plane with the outline of the flap to define the complete guide line on the flap; and
      determining the orientation of the guide plane that is the guide surface.

6. A method as recited in claim 1, further including:
   accepting from the user input to manipulate the position of the guide surface relative to the 3D model of the carton.

7. A method as recited in claim 1, wherein the first and second displays are displayed simultaneously to the user.

8. A method as recited in claim 7, wherein the first and second displays are different windows on the same display screen of a computer system.

9. A method as recited in claim 7, wherein the first and second displays are presented on a first and a second display screen of a computer system that includes a plurality of display screens.

10. A method as recited in claim 1, wherein the 3D model is represented by a set of surfaces made up of one or more elemental surfaces, each elemental surface being defined by a set of points, and wherein the method further includes maintaining for the 3D model both the 3D coordinates and the 2D unfolded view coordinates of the set of points of the elemental surfaces.

11. A method as recited in claim 10, further comprising:
    maintaining for the 3D model an indication of which surfaces in the 3D model are horizontal and which surfaces are vertical.

12. A method as recited in claim 10, wherein the elemental surfaces are triangles, and wherein the set of points defining each triangles is the set of vertices of the triangle.

13. A computer-implemented method of designing a carton having a plurality of panels, each panel made up of one or more flaps, the method comprising:
    displaying a 2D unfolded view of the carton on a first display;
    displaying a perspective 3D view of a 3D model of the carton on a second display;
    accepting from a user input to select a flap using the 3D view, and to add a graphic design to the selected flap using the 2D view;
    updating the 3D view as a result of the adding of the graphic design;
    accepting from the user an indication of the location of a guide line on a flap;
    determining from the indication of the location of the guide line a guide plane such that the guideline is the intersection of the guide plane and the flap;
    determining the intersection of the guide plane and the 3D model of the carton, the intersection defining guide lines on one or more other flaps that are part of the outer surface of the carton; and
    displaying the guide lines on the selected and other outer surface flaps on the 2D unfolded view,
    such that the user can use the guide lines to align graphics being placed on one or more flaps.

14. A method as recited in claim 13, further comprising:
    as a result of accepting the user input to select a flap, automatically modifying the view in the first display to be of the selected flap shown in an orientation configured for the user to design the selected flap, wherein the automatically modifying the view in the first display is arranged so that display shows the selected flap right side up, including temporarily rotating the 2D unfolded model as required to produce the right side up 2D unfolded view.

15. A method as recited in claim 14, wherein the automatically modifying the view includes determining the orientation of the selected flap in the three-dimensional view to ascertain how the 2D unfolded model is to be rotated.

16. A method as recited in claim 13, wherein the first and second displays are displayed simultaneously to the user.

17. A method as recited in claim 13, wherein the 3D model is represented by a set of surfaces made up of one or more elemental surfaces, each elemental surface being defined by a set of points, and wherein the method further includes maintaining for the 3D model both the 3D coordinates and the 2D unfolded view coordinates of the set of points of the elemental surfaces.

18. A computer readable and tangible carrier medium storing computer readable code configured to cause one or more processors of a processing system to implement a method of designing a carton having a plurality of panels, each panel made up of one or more flaps, the method comprising:
   accepting carton structural information corresponding to a carton;
   forming a 2D unfolded model of the substrate that when cut and folded according to the carton structural information forms the carton;
   forming a 3D model of the carton corresponding to the carton structural information;
   displaying on a first display a 2D view of the unfolded carton design;
   displaying on a second display a perspective 3D view of the 3D model of the carton;
   accepting from a user input to manipulate the view of the 3D model on the second display;
   accepting from the user input to select a flap of the carton on the view of the 3D model on the second display;
   as a result of the selecting of a flap, automatically modifying the view in the first display to be of the selected flap shown in an orientation arranged for the user to design the selected flap;
   accepting a design of the selected flap from the user designing using the 2D unfolded view on the first display, including the user placing graphics on the selected flap in the case that the selected flap is one onto which graphics is to be placed;
   modifying the perspective 3D view of the 3D model to include any changes made in the design;
   accepting from the user an indication of the location of a guide line on a flap;
   determining from the indication of the location of the guide line a guide surface such that the guideline is the intersection of the guide surface and the flap;
   determining the intersection of the guide surface and the 3D model of the carton, the intersection defining guide lines on one or more other flaps that are part of the outer surface of the carton; and
   displaying the guide lines on the selected and other outer surface flaps on the 2D unfolded view,
such that the user can indicate on the perspective view an action to be performed on the 2D unfolded view, such that the user can select a flap for design using the 3D view, such that the user can design the selected flap using the 2D unfolded view, such that the perspective display of the 3D model is updated to reflect a change made in the 2D unfolded view, and such that the user can use the guide lines to align graphics being placed on one or more flaps.

19. A carrier medium as recited in claim 18, wherein the automatically modifying the view in the first display is arranged so that display shows the selected flap right side up, including temporarily rotating the 2D unfolded model as required to produce the right side up 2D unfolded view.

20. A carrier medium as recited in claim 19, wherein the automatically modifying the view includes determining the orientation of the selected flap in the three-dimensional view to ascertain how the 2D unfolded model is to be rotated.

21. A carrier medium as recited in claim 18, wherein the method further comprises:
   providing for the user the ability to manipulate the position of the guide plane relative to the 3D model of the carton.

22. A carrier medium as recited in claim 18, wherein the first and second displays are displayed simultaneously to the user.

23. A carrier medium as recited in claim 18, wherein the 3D model is represented by a set of surfaces made up of one or more elemental surfaces, each elemental surface being defined by a set of points, and wherein the method further includes maintaining for the 3D model both the 3D coordinates and the 2D unfolded view coordinates of the set of points of the elemental surfaces.

24. A carrier medium as recited in claim 23, wherein the method further comprises:
   maintaining for the 3D model an indication of which surfaces in the 3D model are horizontal and which surfaces are vertical.

25. A carrier medium as recited in claim 23, wherein the elemental surfaces are triangles, and wherein the set of points defining each triangles is the set of vertices of the triangle.

26. A computer readable and tangible carrier medium storing computer readable code configured to cause one or more processors of a processing system to implement a method of designing a carton having a plurality of panels, each panel made up of one or more flaps, the method comprising:
   displaying a 2D unfolded view of the carton on a first display;
   displaying a perspective 3D view of a 3D model of the carton on a second display;
   accepting from a user input to select a flap using the 3D view, and to add a graphic design to the selected flap using the 2D view;
   updating the 3D view as a result of the adding of the graphic design;
   accepting from the user an indication of the location of a guide line on a flap;
   determining from the indication of the location of the guide line a guide plane such that the guideline is the intersection of the guide plane and the flap;
   determining the intersection of the guide plane and the 3D model of the carton, the intersection defining guide lines on one or more other flaps that are part of the outer surface of the carton; and
   displaying the guide lines on the selected and other outer surface flaps on the 2D unfolded view,
such that the user can use the guide lines to align graphics being placed on one or more flaps.

27. A carrier medium as recited in claim 26, wherein the method further comprises:
   as a result of the user selecting a flap, automatically modifying the view in the first display to be of the selected flap shown in an orientation configured for the user to design the selected flap,
wherein the automatically modifying the view in the first display is arranged so that display shows the selected flap right side up, including temporarily rotating the 2D unfolded model as required to produce the right side up 2D unfolded view.

28. A carrier medium as recited in claim 27, wherein the automatically modifying the view includes determining the orientation of the selected flap in the three-dimensional view to ascertain how the 2D unfolded model is to be rotated.

29. A carrier medium as recited in claim 26, wherein the first and second displays are displayed simultaneously to the user.

30. A carrier medium as recited in claim 26, wherein the 3D model is represented by a set of surfaces made up of one or more elemental surfaces, each elemental surface being defined by a set of points, and wherein the method further includes maintaining for the 3D model both the 3D coordinates and the 2D unfolded view coordinates of the set of points of the elemental surfaces.

31. An apparatus for designing a carton having a plurality of panels, each panel made up of one or more flaps, the apparatus comprising:
  means for accepting carton structural information corresponding to a carton;
  means for forming a 2D unfolded model of the substrate that when cut and folded according to the carton structural information forms the carton;
  means for forming a 3D model of the carton corresponding to the carton structural information;
  means for displaying on a first display a 2D view of the unfolded carton design;
  means for displaying on a second display a perspective 3D view of the 3D model of the carton;
  means for accepting from a user input to manipulate the view of the 3D model on the second display;
  means for accepting from the user input to select a flap of the carton on the view of the 3D model on the second display;
  means for automatically modifying the view in the first display, as a result of the selecting of a flap, the modified view being of the selected flap shown in an orientation arranged for the user to design the selected flap;
  means for accepting a design of the selected flap from the user designing using the 2D unfolded view on the first display, including the user placing graphics on the selected flap in the case the selected flap in one onto which graphics is to be placed;
  means for automatically modifying the perspective 3D view of the 3D model to include any changes made in the design;
  means for accepting from the user an indication of the location of a guide line on a flap;
  means for determining from the indication of the location of the guide line a guide plane such that the guideline is the intersection of the guide plane and the flap;
  means for determining the intersection of the guide plane and the 3D model of the carton, the intersection defining guide lines on one or more other flaps that are part of the outer surface of the carton; and
  means for displaying the guide lines on the selected and other outer surface flaps on the 2D unfolded view,
such that the user can indicate on the perspective view and action to be performed on the 2D unfolded view, such that the user can select a flap for design using the 3D view, such that the user can design the selected flap using the 2D unfolded view, such that the perspective display of the 3D model is updated to reflect a change made in the 2D unfolded view, and
such that the user can use the guide lines to align graphics being placed on one or more flaps.

32. An apparatus as recited in claim 31, wherein the means for automatically modifying the view in the first display is arranged so that modified view shows the selected flap right side up, including temporarily rotating the 2D unfolded model as required to produce the right side up 2D unfolded view.

33. An apparatus as recited in claim 32, wherein the means for automatically modifying the view includes means for determining the orientation of the selected flap in the three-dimensional view to ascertain how the 2D unfolded model is to be rotated.

34. An apparatus as recited in claim 31, wherein the first and second displays are displayed simultaneously to the user.

35. An apparatus as recited in claim 31, wherein the 3D model is represented by a set of surfaces made up of one or more triangles, each triangle being defined by a set of vertices, and wherein the apparatus further includes means for maintaining for the 3D model both the 3D coordinates and the 2D unfolded view coordinates of the set of vertices of the triangles.

36. An apparatus carrying computer readable code configured to cause one or more processors of a processing system to implement a method of designing a carton having a plurality of panels, each panel made up of one or more flaps, the method comprising:
  means for displaying a 2D unfolded view of the carton on a first display;
  means for displaying a perspective 3D view of a 3D model of the carton on a second display;
  means for accepting from a user input to select a flap using the 3D view, and to add a graphic design to the selected flap using the 2D view;
  means for automatically updating the 3D view as a result of the adding of the graphic design;
  means for accepting from the user an indication of the location of a guide line on a flap;
  means for determining from the indication of the location of the guide line a guide plane such that the guideline is the intersection of the guide plane and the flap;
  means for determining the intersection of the guide plane and the 3D model of the carton, the intersection defining guide lines on one or more other flaps that are part of the outer surface of the carton; and
  means for displaying the guide lines on the selected and other outer surface flaps on the 2D unfolded view,
such that the user can use the guide lines to align graphics being placed on one or more flaps.

37. An apparatus as recited in claim 36, further comprising:
  means for automatically modifying the view in the first display, as a result of the user selecting a flap, to be of the selected flap shown in an orientation arranged for the user to design the selected flap,
wherein the means for automatically modifying the view in the first display is arranged so that display shows the selected flap right side up, including temporarily rotating the 2D unfolded model as required to produce the right side up 2D unfolded view.

* * * * *